United States Patent
Sandridge et al.

(10) Patent No.: US 11,599,905 B2
(45) Date of Patent: *Mar. 7, 2023

(54) METHOD AND SYSTEM FOR RECOMMENDING PROMOTIONS TO CONSUMERS

(71) Applicant: Groupon, Inc., Chicago, IL (US)

(72) Inventors: Jonathan Gray Sandridge, Palo Alto, CA (US); Sebastian Heycke, San Francisco, CA (US)

(73) Assignee: GROUPON, INC.

( * ) Notice: Subject to any disclaimer, the term of this patent is extended or adjusted under 35 U.S.C. 154(b) by 0 days.

This patent is subject to a terminal disclaimer.

(21) Appl. No.: 17/444,622

(22) Filed: Aug. 6, 2021

(65) Prior Publication Data

US 2022/0020059 A1   Jan. 20, 2022

Related U.S. Application Data

(63) Continuation of application No. 14/574,343, filed on Dec. 17, 2014, now Pat. No. 11,113,725.

(Continued)

(51) Int. Cl.
*G06Q 30/02* (2012.01)
*G06Q 30/0251* (2023.01)
*G06Q 50/00* (2012.01)

(52) U.S. Cl.
CPC ..... *G06Q 30/0257* (2013.01); *G06Q 30/0269* (2013.01); *G06Q 50/01* (2013.01)

(58) Field of Classification Search
CPC .......... G06Q 30/02; G06Q 30/0207–30/0277; G06Q 30/0257; G06Q 30/0269; G06Q 50/01
See application file for complete search history.

(56) References Cited

U.S. PATENT DOCUMENTS 8,254,699 B1 * 8/2012 Zhao ............... G06K 9/6232
706/20
8,977,617 B1 * 3/2015 Wu ............... G06F 16/9535
707/736

(Continued)

FOREIGN PATENT DOCUMENTS

WO   2011/097624 A2   8/2011
WO   WO2011097624 A2 *   8/2011

OTHER PUBLICATIONS

U.S. Appl. No. 14/574,343, filed Dec. 17, 2014, U.S. Pat. No. 11,113,725.

*Primary Examiner* — Thuy N Nguyen
(74) *Attorney, Agent, or Firm* — Alston & Bird LLP

(57) ABSTRACT

Embodiments provide computer systems, computer-executable methods and one or more non-transitory computer-readable media for offering one or more promotions to consumers using a promotion and marketing service. User input may be received from a first consumer interface associated with a first consumer, the user input including an interest indication relating to a first promotion. An association between the first consumer and a second consumer for sharing of promotions may be programmatically retrieved or generated. Based on the association, it may be determined whether to offer the first promotion to the second consumer based on one or more characteristics associated with the second consumer. Based on a determination that the first promotion should be offered to the second consumer, an indication may be outputted, the indication configured to cause an impression of the first promotion to be generated on a second consumer interface associated with the second consumer.

12 Claims, 17 Drawing Sheets

Related U.S. Application Data

(60) Provisional application No. 61/917,247, filed on Dec. 17, 2013.

(56) References Cited

U.S. PATENT DOCUMENTS

| | | | | |
|---|---|---|---|---|
| 9,317,610 B2* | 4/2016 | Vaynblat | | G06Q 50/01 |
| 2009/0171754 A1* | 7/2009 | Kane | | G06F 16/9535 |
| | | | | 715/744 |
| 2009/0228296 A1* | 9/2009 | Ismalon | | G06Q 30/02 |
| | | | | 707/999.102 |
| 2009/0307089 A1* | 12/2009 | Binnewies | | G06Q 30/02 |
| | | | | 705/14.69 |
| 2010/0057546 A1* | 3/2010 | Wang | | G06Q 30/0241 |
| | | | | 705/14.4 |
| 2010/0114654 A1* | 5/2010 | Lukose | | G06Q 30/0256 |
| | | | | 705/14.54 |
| 2011/0173264 A1* | 7/2011 | Kelly | | G06F 16/94 |
| | | | | 709/205 |
| 2011/0179116 A1* | 7/2011 | Solomon | | G06Q 30/02 |
| | | | | 709/204 |
| 2011/0231257 A1* | 9/2011 | Winters | | G06Q 30/0255 |
| | | | | 705/14.53 |
| 2011/0302032 A1* | 12/2011 | Ishii | | G06Q 30/0255 |
| | | | | 715/739 |
| 2012/0047014 A1* | 2/2012 | Smadja | | G06Q 30/0255 |
| | | | | 707/E17.089 |
| 2012/0246001 A1* | 9/2012 | Matz | | H04N 21/6582 |
| | | | | 705/14.53 |
| 2012/0278179 A1* | 11/2012 | Campbell | | G06Q 30/0255 |
| | | | | 705/14.69 |
| 2012/0331067 A1* | 12/2012 | Richter | | G06Q 50/01 |
| | | | | 709/206 |
| 2013/0122934 A1* | 5/2013 | Branch | | G06Q 30/0241 |
| | | | | 455/456.3 |
| 2013/0124298 A1* | 5/2013 | Li | | G06Q 30/0241 |
| | | | | 705/14.42 |
| 2014/0059443 A1 | 2/2014 | Tabe | | |
| 2014/0067829 A1* | 3/2014 | Barney | | G06F 16/14 |
| | | | | 707/748 |
| 2014/0156681 A1* | 6/2014 | Lee | | G06F 16/9535 |
| | | | | 707/754 |
| 2014/0279233 A1 | 9/2014 | Lau et al. | | |
| 2014/0282977 A1* | 9/2014 | Madhu | | H04L 67/52 |
| | | | | 726/7 |
| 2014/0297740 A1* | 10/2014 | Narayanan | | G06Q 10/10 |
| | | | | 709/204 |
| 2015/0120714 A1* | 4/2015 | Xu | | G06F 16/24578 |
| | | | | 707/723 |
| 2015/0127628 A1* | 5/2015 | Rathod | | H04W 4/21 |
| | | | | 707/710 |

\* cited by examiner

METHOD AND SYSTEM FOR RECOMMENDING PROMOTIONS TO CONSUMERS

CROSS REFERENCE TO RELATED APPLICATIONS

This application is a continuation of U.S. patent application Ser. No. 14/574,343, filed Dec. 17, 2014, which claims priority to U.S. Provisional Application No. 61/917,247, filed Dec. 17, 2013, each of which is hereby incorporated by reference.

TECHNOLOGICAL FIELD

Example embodiments of the present invention relate generally to promotion management and, more particularly, to a method and apparatus for recommending promotions to consumers.

BACKGROUND

Via electronic networks (e.g., the Internet), promotional systems provide promotions associated with merchants to consumer devices. Certain promotional and marketing services enable consumers to share promotions with other consumers. In this regard, areas for improving current promotion sharing techniques have been identified and technical solutions have been implemented in exemplary embodiments.

BRIEF SUMMARY

In accordance with one exemplary embodiment, a computer-executable method is provided for offering a promotion to a consumer using a promotion and marketing service. The method includes receiving user input from a first consumer interface associated with a first consumer, the user input comprising an interest indication relating to the first promotion. The method also includes programmatically retrieving, from a consumer association database stored on a non-transitory computer-readable medium, an association between the first consumer and a second consumer for sharing of promotions. The method also includes determining, using circuitry provided on a computing device, whether to offer the first promotion to the second consumer based on one or more characteristics associated with the second consumer. The method further includes, based on a determination that the first promotion should be offered to the second consumer, outputting an indication configured to cause a second impression of the first promotion to be generated on a second consumer interface associated with the second consumer.

In accordance with another exemplary embodiment, a computer-executable method is provided for associating a plurality of consumers using a promotion and marketing service. The method includes programmatically retrieving one or more profile data features associated with a first consumer, programmatically retrieving one or more profile data features associated with a second consumer, and programmatically retrieving data on one or more prior activities performed by the second consumer in relation to one or more prior promotions offered to the second consumer. The method also includes automatically generating, using circuitry provided on a computing device, an association between the first consumer and the second consumer based on the one or more profile data features of the first consumer, the one or more profile data features of the second consumer, and the data on the one or more prior activities performed by the second consumer. The method further includes recording the association between the first consumer and the second consumer in a consumer association database stored on a non-transitory computer-readable medium.

In accordance with another exemplary embodiment, one or more non-transitory computer-readable media are provided. The computer-readable media have encoded thereon one or more computer-executable instructions for performing a method for offering a promotion to a consumer using a promotion and marketing service. The method includes receiving user input from a first consumer interface associated with a first consumer, the user input comprising an interest indication relating to the first promotion. The method also includes programmatically retrieving, from a consumer association database stored on a non-transitory computer-readable medium, an association between the first consumer and a second consumer for sharing of promotions. The method also includes determining, using circuitry provided on a computing device, whether to offer the first promotion to the second consumer based on one or more characteristics associated with the second consumer. The method further includes, based on a determination that the first promotion should be offered to the second consumer, outputting an indication configured to cause a second impression of the first promotion to be generated on a second consumer interface associated with the second consumer.

In accordance with another exemplary embodiment, one or more non-transitory computer-readable media are provided. The computer-readable media have encoded thereon one or more computer-executable instructions for performing a method for offering a promotion to a consumer using a promotion and marketing service. The method includes programmatically retrieving one or more profile data features associated with a first consumer, programmatically retrieving one or more profile data features associated with a second consumer, and programmatically retrieving data on one or more prior activities performed by the second consumer in relation to one or more prior promotions offered to the second consumer. The method also includes automatically generating, using circuitry provided on a computing device, an association between the first consumer and the second consumer based on the one or more profile data features of the first consumer, the one or more profile data features of the second consumer, and the data on the one or more prior activities performed by the second consumer. The method further includes recording the association between the first consumer and the second consumer in a consumer association database stored on a non-transitory computer-readable medium.

In accordance with another exemplary embodiment, a computer system is provided. The computer system includes a storage device configured to store a consumer association database and processing circuitry. The processing circuitry is configured to receive user input from a first consumer interface associated with a first consumer, the user input comprising an interest indication relating to the first promotion. The processing circuitry is also configured to programmatically retrieve, from the consumer association database, an association between the first consumer and a second consumer for sharing of promotions. The processing circuitry is also configured to determine whether to offer the first promotion to the second consumer based on one or more characteristics associated with the second consumer. The processing circuitry is further configured to, based on a determination that the first promotion should be offered to the second consumer, output an indication configured to cause a second impression of the first promotion to be generated on a second consumer interface associated with the second consumer.

In accordance with another exemplary embodiment, a computer system is provided. The computer system includes a storage device configured to store a consumer association database and processing circuitry. The processing circuitry is configured to programmatically retrieve one or more profile data features associated with a first consumer, programmatically retrieve one or more profile data features associated with a second consumer, and programmatically retrieve data on one or more prior activities performed by the second consumer in relation to one or more prior promotions offered to the second consumer. The processing circuitry is also configured to generate an association between the first consumer and the second consumer based on the one or more profile data features of the first consumer, the one or more profile data features of the second consumer, and the data on the one or more prior activities performed by the second consumer. The processing circuitry is further configured to record the association between the first consumer and the second consumer in the consumer association database.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings.

Figure 1:
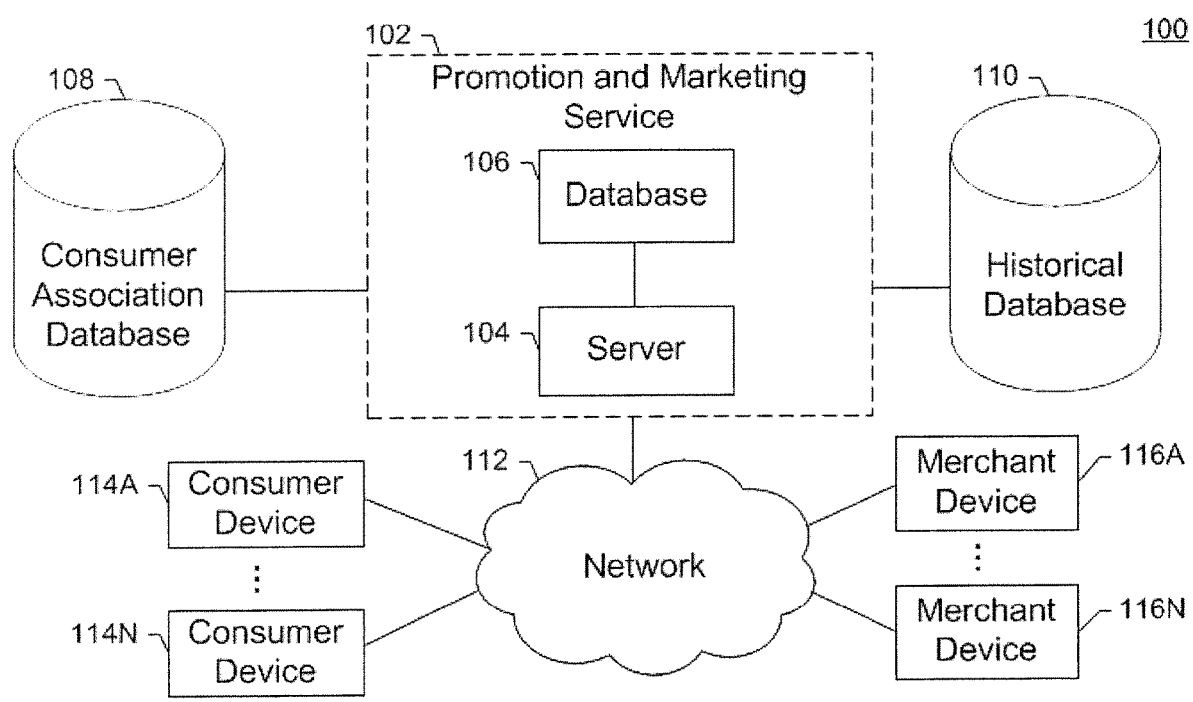
FIG. 1 is a block diagram illustrating an exemplary system within which exemplary embodiments may operate.

The accompanying drawings are not intended to be drawn to scale.

DETAILED DESCRIPTION

Exemplary embodiments provide computer systems, computer-executable methods and one or more non-transitory computer-readable media for recommending or offering one or more promotions to one or more consumers using a promotion and marketing service. The ability to recommend promotions for purchase that are of particular relevance to each consumer is important, according to some examples, in a promotion and marketing service as it helps maintain an active and engaged customer base and maximize profits for the service. Exemplary embodiments provide technical solutions for analyzing and leveraging information in promotion sharing activities performed by consumers to generate automatic recommendations or offers of promotions that are targeted and relevant to consumers. Exemplary embodiments also provide technical solutions that derive promotion recommendations or offers for a particular consumer based on the activities of one or more other consumers who may or may not be linked to that particular consumer or who may or may not have otherwise participated in prior promotion sharing activities with that particular consumer. Advantages of exemplary embodiments include focused and targeted promotion recommendations or offers that do not necessitate manual sharing of promotions among consumers.

In certain exemplary embodiments, two or more consumers may be related to one another as being in a promotion sharing association in a consumer association database, and an association score may be provided for each promotion sharing association. A promotion sharing association may include two or more consumers. A promotion sharing association may be generated, in some cases, based on prior promotion sharing activities, other promotion activity data and/or profile data of the consumers. Once two consumers are related in a promotion sharing association, when a first consumer generates an interest indication in relation to a promotion offered to the first consumer, this indicates that the promotion may also be relevant to a second consumer.

An interest indication may include a viewing activity, a purchase activity, a promotion rating activity, an activity expressing a willingness to purchase the promotion, and the like, as expressed by the first consumer. Exemplary embodiments may automatically offer the promotion to a second consumer in a promotion sharing association with the first consumer, based on the association score. In certain embodiments, a reason for offering the promotion may also be displayed to the second consumer. The reason may indicate, for example, that the promotion is being offered to the second consumer because the first consumer expressed an interest indication in relation to the promotion.

In some embodiments, a single association score may be provided for a promotion sharing association. The association score may encompass all types, categories and sub-categories of promotions.

In other embodiments, a plurality of association scores may be provided for a promotion sharing association. The association scores for a single promotion sharing association may pertain to different types, categories and sub-categories of promotions. For example, a first association score may be provided for a first promotion type (e.g., travel promotions) for a first promotion sharing association, while a second association score may be provided for a second promotion type (e.g., sports promotions) for the first promotion sharing association. In determining whether to recommend a particular promotion to a second consumer, embodiments may consider the specific association score corresponding to the first and second consumers that encompasses that particular promotion. For example, in determining whether to recommend a travel-related promotion to a second consumer based on an interest indication expressed by a first consumer, embodiments may consider the first travel-related association score for the promotion sharing association.

Definitions of Terms

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "consumer interface" may include any digitally rendered user interface displayed on a visual display device for enabling a consumer to interface with a promotion and marketing service. An exemplary consumer interface may enable a consumer to view one or more promotions, purchase one or more promotions, share one or more promotions with other consumers, receive messages and/or promotions from other consumers, receive messages from the promotion and marketing service, and the like. Exemplary consumer interfaces may be rendered in any desired form including, but not limited to, as a mobile application for display on a mobile computing device (e.g., a smartphone), a webpage or website for display on a mobile or non-mobile computing device via the Internet, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "promotion sharing activity," may include any activity performed by a first consumer that causes a promotion to be offered to a second consumer.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling well or that sales of the product or service result in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the term "interest indication" refers to an indication generated by a consumer in relation to a promotion, the interest indication indicating one or more of: purchase of the promotion by the consumer, viewing of the promotion by the consumer, rating of the promoting by the consumer, any activity performed by the consumer indicating a willingness to purchase the promotion (e.g., by adding it to a wish-list, by adding it to a favorites list), and the like.

As used herein, the terms "association," "consumer association" and "promotion sharing association" are used interchangeably to refer to a link or relationship between two or more consumers indicating that a promotion offered to one of the consumers should also be offered to the other consumers. A promotion sharing association may be programmatically generated and stored in a consumer association database in some exemplary embodiments.

As used herein, the term "association score" for an association between two or more consumers refers to a programmatically determined likelihood that a promotion offered to the consumers will generate purchases by all of the consumers in the association.

As used herein, the term "consumer association database" refers to a data structure or any suitable data storage structure that stores data indicating one or more promotion sharing associations between consumers. The consumer association database may identify two or more consumers in each promotion sharing association. In some embodiments, the consumer association database may include additional information, e.g., whether a promotion sharing association is general for all categories of promotions, whether a promotion sharing association is based on a specific category of promotions (e.g., only travel-related promotions), whether a promotion sharing association is unidirectional (e.g., promotions purchased by a first consumer may be automatically offered to a second consumer, but those purchased by the second consumer may not automatically be offered to the first consumer), whether a promotion sharing association is bidirectional (e.g., promotions purchased by a first consumer may be automatically offered to a second consumer, and vice versa), and the like.

As used herein, the term "vector" refers to a digitally generated representation of profile data and/or activity data associated with a consumer as a vector in multidimensional space. The multi-dimensional space may map a consumer to his/her profile data and activity data in order to facilitate a machine learning system implementing a machine learning algorithm embodied on one or more computer-readable media.

As used herein, the term "training vector" refers to a vector that may be used in training a machine learning system implementing a machine learning algorithm embodied on one or more computer-readable media.

As used herein, the term "testing vector" refers to a vector that may be used in testing a trained machine learning system implementing a machine learning algorithm embodied on one or more computer-readable media.

As used herein, the term "machine learning system" refers to a computing system implementing a machine learning algorithm embodied on one or more computer-readable media.

As used herein, the term "computer-readable medium" refers to a non-transitory storage hardware, non-transitory storage device or non-transitory computer system memory that may be accessed by a controller, a microcontroller, a computational system or a component of a computational system to encode thereon computer-executable instructions or software programs. The "computer-readable medium" may be accessed by a computational system or a component of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM) and the like.

As used herein, the term "set" refers to a collection of one or more items.

As used herein, the term "plurality" refers to two or more items.

As used herein, the terms "equal" and "substantially equal" refer interchangeably, in a broad lay sense, to exact equality or approximate equality within some tolerance.

As used herein, the terms "similar" and "substantially similar" refer interchangeably, in a broad lay sense, to exact sameness or approximate similarity within some tolerance.

As used herein, the terms "couple," "coupled" and "coupling" refer to a direct or indirect connection among two or more components. For example, a first component may be coupled to a second component directly or through one or more intermediate components.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although the clickstream data provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic data available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

System Architecture and Example Apparatus

Some exemplary embodiments of the present invention will now be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing service 102 may comprise a server 104 in communication with a database 106.

The promotional system 102 may have access to a consumer association database or any suitable data storage structure 108 that stores data indicating promotion sharing associations among consumers for promotion sharing, and a historical database 110 storing information regarding consumer profile data and prior activities performed by consumers. In various embodiments, promotional database 106, consumer association database 108, and historical database 110 may be distinct databases, or may alternatively refer to a single database.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, clickstream data, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic information among one or more consumer devices, merchant devices, and the promotion and marketing service is described below with respect to FIG. 4.

Example Apparatuses for Implementing Embodiments of the Present Invention

Figure 2:
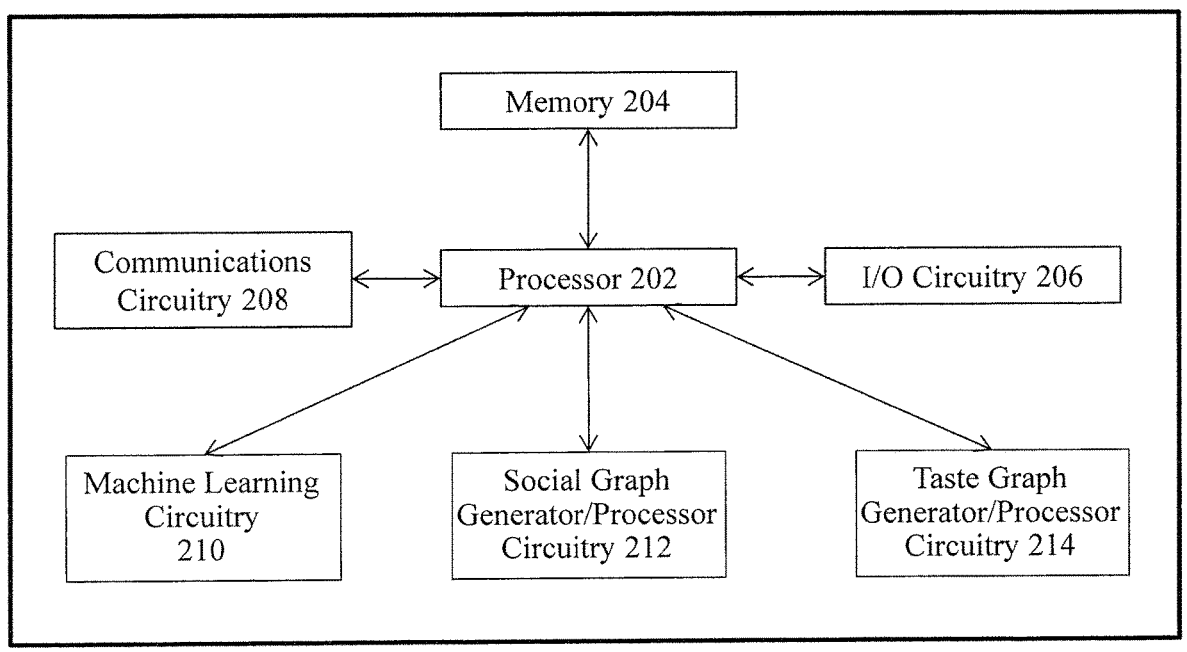
FIG. 2 is a block diagram illustrating exemplary components of a computing device for use in a promotional server in accordance with certain exemplary embodiments.

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, machine learning circuitry 210, social graph generator/processor circuitry 212, and taste graph generator/processor circuitry 214. The apparatus 200 may be configured to execute the operations described above with respect to FIG. 1 and below with respect to FIGS. 4-17. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s)

Figure 13:
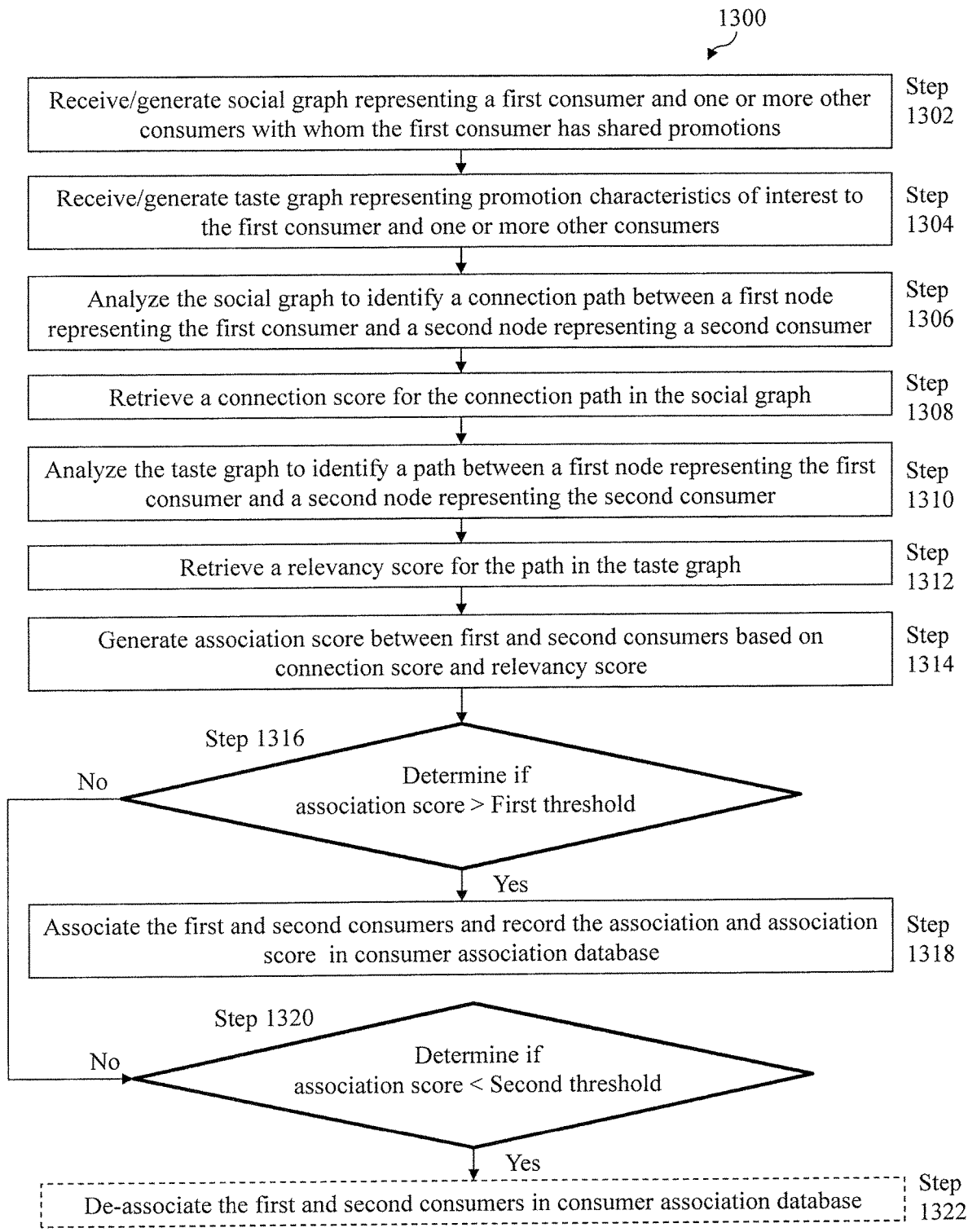
FIG. 13 is a flowchart illustrating an exemplary computer-executable method for using a social graph and a taste graph in determining a promotion sharing association between a first consumer and a second consumer.
Figure 14:
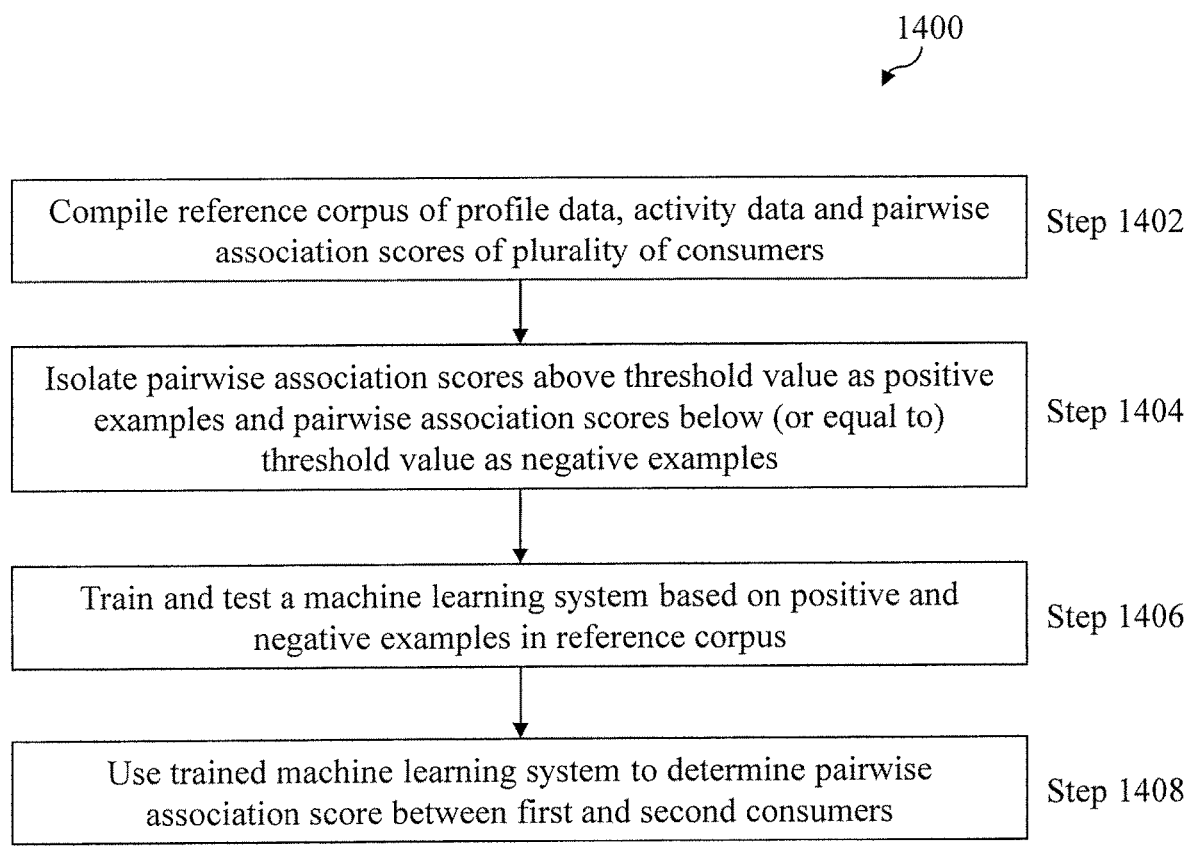
FIG. 14 is a flowchart illustrating an exemplary computer-executable method for training and using a machine learning system in determining a promotion sharing association between a first consumer and a second consumer.
Figure 15:
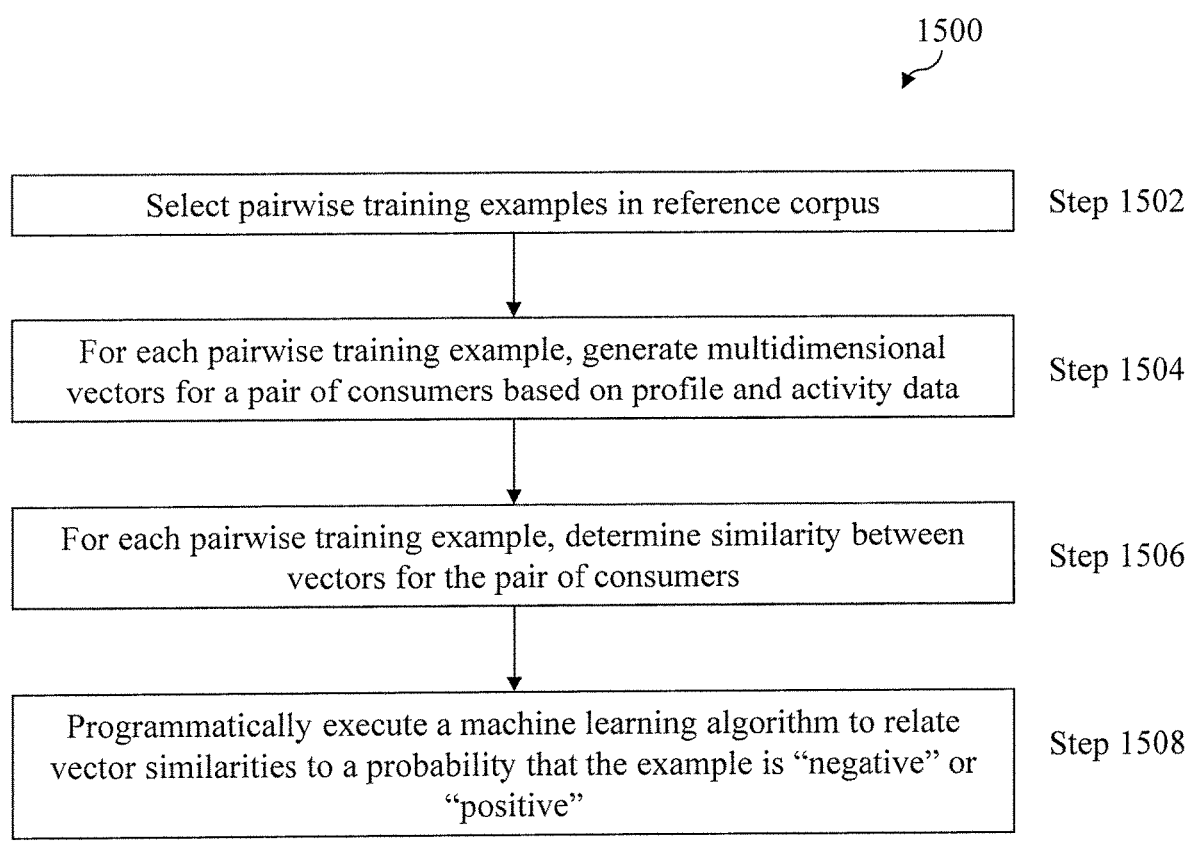
FIG. 15 is a flowchart illustrating an exemplary computer-executable method for training the machine learning system referenced in FIG. 14.

The machine learning circuitry 210 includes hardware configured to implement a machine learning algorithm configured to perform the methods illustrated in FIGS. 13-15. The machine learning circuitry 210 may utilize processing circuitry, such as the processor 202, to perform these actions. The machine learning circuitry 210 may receive the data via a network interface provided by the communications circuitry 208. However, it should also be appreciated that, in some embodiments, the machine learning circuitry 210 may include a separate processor, specially configured field programmable gate array (FPGA), or application specific interface circuit (ASIC) to perform implement the machine learning algorithm. The machine learning circuitry 210 is therefore implemented using hardware components of the apparatus configured by either hardware or software for implementing these planned functions.

The social graph generator and processor circuitry 212 includes hardware configured to use data in the historical database 110 to generate a social graph which is a digital representation of real-world promotion sharing activities connecting a plurality of consumers. For example, the social graph generator and processor circuitry 212 may implement one or more computer executable instructions to perform the methods illustrated in FIGS. 10 and 13. The social graph generator and processor circuitry 212 may utilize processing circuitry, such as the processor 202, to perform these actions. The social graph generator and processor circuitry 212 may receive data from the historical database 110 via a network data interface, such as a network interface provided by the communications circuitry 208. However, it should also be appreciated that, in some embodiments, the social graph generator and processor circuitry 212 may include a separate processor, specially configured field programmable gate array (FPGA), or application specific interface circuit (ASIC) to perform implement the machine learning algorithm. The social graph generator and processor circuitry 212 is therefore implemented using hardware components of the apparatus configured by either hardware or software for implementing these planned functions.

The taste graph generator and processor circuitry 214 includes hardware configured to use data in the historical database 110 to generate a taste graph which is a digital representation of commonalities in promotion interests among a plurality of consumers. The taste graph generator and processor circuitry 214 may implement one or more computer-executable instructions to perform the methods illustrated in FIGS. 12 and 13. The taste graph generator and processor circuitry may use data in the historical database 110 to generate the taste graph. The taste graph generator and processor circuitry 214 may utilize processing circuitry, such as the processor 202, to perform these actions. The taste graph generator and processor circuitry 214 may receive data from the historical database 110 via a network data interface, such as a network interface provided by the communications circuitry 208. However, it should also be appreciated that, in some embodiments, the taste graph generator and processor circuitry 214 may include a separate processor, specially configured field programmable gate array (FPGA), or application specific interface circuit (ASIC) to perform implement the machine learning algorithm. The taste graph generator and processor circuitry 214 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Figure 3:
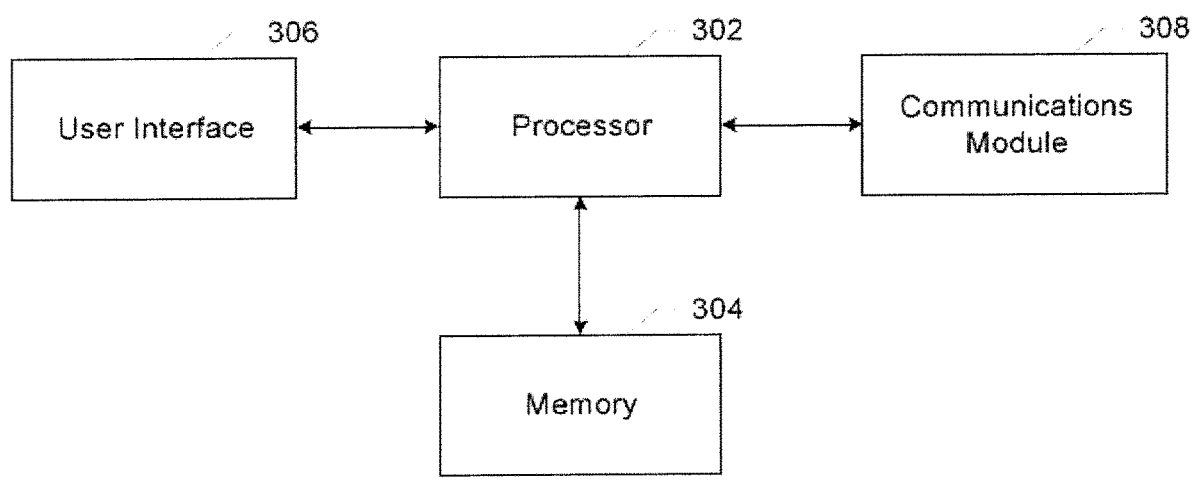
FIG. 3 is a block diagram illustrating exemplary components of a computing device for use by a consumer or merchant in accordance with an exemplary embodiment.

Referring now to FIG. 3, a block diagram is illustrated showing an example end-user device, apparatus 300, that may be configured to enable a user to view promotions from outside the promotional system 102 in accordance with embodiments of the present invention. In FIG. 3, the apparatus 300, which may embody consumer device 114 or merchant device 116, may include or otherwise be in communication with a processor 302, a memory 304, a communications circuitry 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions, the instructions may specifically configure the processor 302 to perform the algorithms and/or operations described herein when the instructions are executed.

In some embodiments, the apparatus 300 may include a user interface 306 that may, in turn, be in communication with processor 302 to provide output to the user and, in some embodiments, to receive an indication of a user input. As such, the user interface 306 may include a display and may comprise a web user interface, a mobile application, a client device, a kiosk, or the like. In some embodiments, the user interface 306 may also include a keyboard, a mouse, a touch screen, touch areas, soft keys, a microphone, a speaker, or other input/output mechanisms. The processor 302, or user interface circuitry comprising the processor 302, may be configured to control one or more functions of one or more user interface elements through computer program instructions (e.g., software and/or firmware) stored on a memory accessible to the processor (e.g., memory 304, and/or the like).

Meanwhile, the communications circuitry 308 may be any means such as a device or circuitry embodied in either hardware or a combination of hardware and software that is configured to receive and/or transmit data from/to a network and/or any other device or module in communication with the apparatus 300 (e.g., promotional server 104 or, more generally, promotional system 102, other consumer devices 114 or merchant devices 116, or the like). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

Example Electronic Marketing Information Service Data Flow

Figure 4:
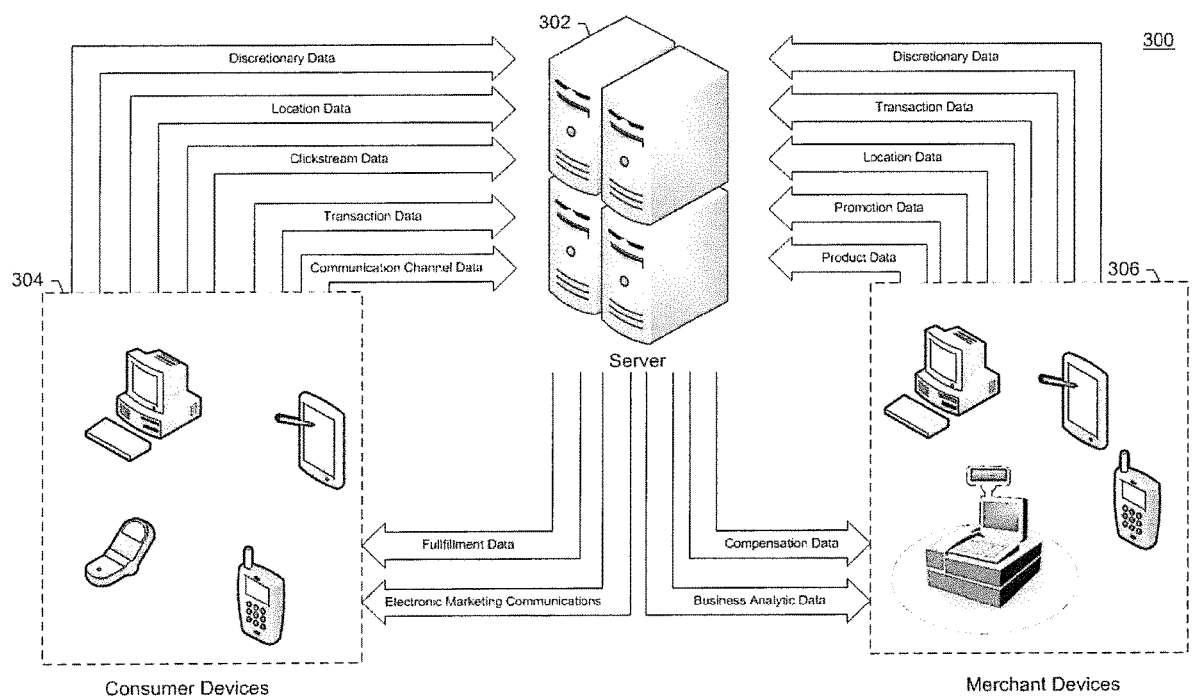
FIG. 4 is a data flow diagram illustrating the flow of information between different computer nodes in accordance with an exemplary embodiment.

FIG. 4 depicts an example data flow 400 illustrating interactions between a server 402, one or more consumer devices 404, and one or more merchant devices 406. The server 402 may be implemented in the same or a similar fashion as the server 104 as described above with respect to FIG. 1, the one or more consumer devices 404 may be implemented in the same or a similar fashion as the consumer devices 108A-108N as described above with respect to FIG. 1, and the one or more merchant devices 406 may be implemented in the same or a similar fashion as the merchant devices 110A-110N as described above with respect to FIG. 1.

The data flow 400 illustrates how electronic information may be passed among various systems when employing a server 402 in accordance with embodiments of the present invention. The one or more consumer devices 404 and/or one or more merchant devices 406 may provide a variety of electronic marketing information to the server 402 for use in providing promotion and marketing services to the consumer. This electronic marketing information may include, but is not limited to, location data, clickstream data, transaction data, communication channel data, and/or discretionary data.

As a result of transactions performed between the one or more consumer devices 404 and the server 402, the server 402 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 404 offered by the server 402, the server 402 may leverage information provided by the consumer devices to improve the relevancy of marketing communications to individual consumers or groups of consumers. In this manner, the server 402 may determine promotions, goods, and services that are more likely to be of interest to a particular consumer or group of consumers based on clickstream data, location data, and other information provided by and/or relating to particular consumers. For example, the server 402 may detect the location of a consumer based on location data provided by the consumer device, and offer promotions based on the proximity of the consumer to the merchant associated with those promotions.

Alternatively, the server 402 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 402 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 402 may also control other factors of the electronic marketing communications sent to the consumer other than the particular promotions included in the electronic marketing communication. For example, the server 402 may determine the form, structure, frequency, and type of the electronic marketing communication. As with the content of the electronic marketing communication, these factors may be programmatically determined according to various methods, factors, and processes based on electronic data received by the server 402 for the purpose of maximize the likelihood that the communication will be relevant to the recipient consumer.

The server 402 interactions with the one or more merchant devices 406 may be related to enabling the merchant to market their products using a promotion and marketing service. For example, the one or more merchant devices 406 may provide promotion data defining one or more promotions to be offered by the promotion and marketing service on behalf of the merchant. The server 402 may receive this information and generate information for providing such promotions via an e-commerce interface, making the promotions available for purchase by consumers. The server 402 may also receive information about products from the one or more merchant devices 406. For example, a merchant may provide electronic marketing information indicating particular products, product prices, inventory levels, and the like to be marketed via a promotion and marketing service. The server 402 may receive this information and generate listing information to offer the indicating products to consumers via a promotion and marketing service.

The one or more merchant devices 406 may also receive information from the server 402. For example, in some embodiments a merchant may obtain access to certain business analytic data aggregated, generated, or maintained by the server 402. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model. The one or more merchant devices 406 may also receive electronic compensation data from the server 402. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Figure 5:
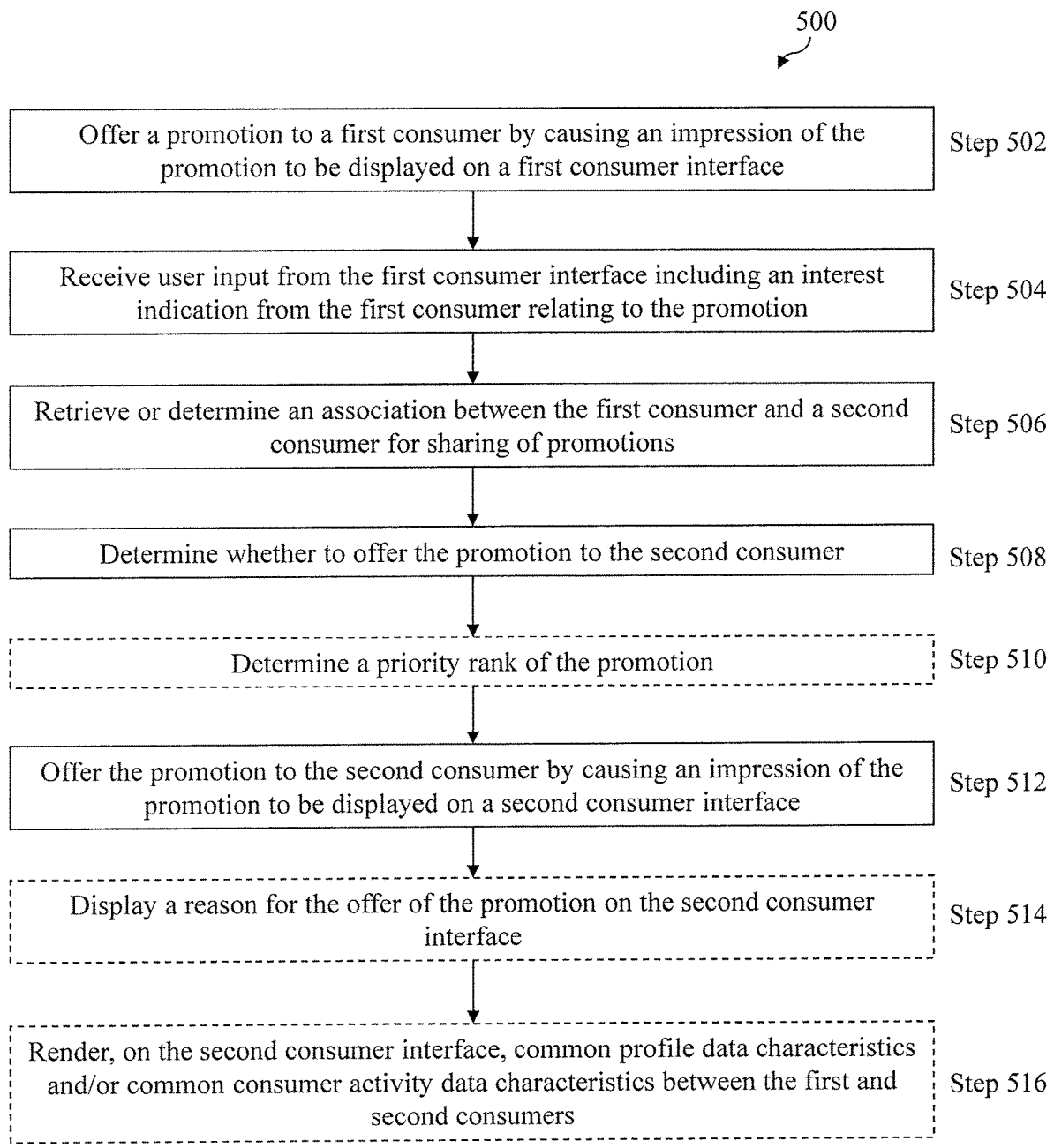
FIG. 5 is a flowchart illustrating an exemplary computer-executable method for offering a promotion to a consumer using a promotion and marketing service.

FIG. 5 is a flowchart illustrating an exemplary computer-executable method 500 for recommending or offering a promotion to a consumer using a promotion and marketing service. In some embodiments, in step 502, a promotion may be offered to a first consumer by a promotion and marketing service by outputting an indication configured to cause an impression of the promotion to be displayed on a first consumer interface associated with the first consumer. In some embodiments, in step 504, user input including an interest indication may be received from the first consumer interface in relation to the promotion offered. The interest indication may include an indication that the first consumer viewed the promotion, purchased the promotion, rated the promotion, and/or otherwise indicated a willingness to purchase the promotion (e.g., by adding it to a wish-list, a favorites list or the like).

In step 506, a promotion sharing association or lack of a promotion sharing association between the first consumer and a second consumer may be determined or received. Exemplary methods for performing step 506 are described in detail in connection with FIGS. 8-15.

In step 508, the method may determine if the promotion offered to the first consumer should also be offered to the second consumer based on the promotion sharing association. For example, if it is determined that the first and second consumers are not associated in a consumer association database, the promotion may be not be automatically offered to the second consumer, whereas the promotion may be automatically offered to the second consumer if the first and second consumers are associated in the consumer association database. In some cases, an association score for the promotion sharing association may be used to determine whether to automatically offer the promotion to the second consumer. For example, the promotion may be automatically offered to the second consumer only if the association score exceeds a threshold score. In some cases, this determination may also be based on one or more additional factors including, but not limited to, profile data items of the first and second consumers.

One of ordinary skill in the art will recognize that steps 502-508 may be repeated to offer a plurality of promotions to the second consumer. In step 510, in some embodiments, a ranking for each promotion may be determined among the plurality of promotions based, for example, on the association scores used to determine the promotions.

In step 512, the promotion determined in step 508 may be offered to the second consumer by outputting an indication configured to cause an impression of the promotion to be displayed on a second consumer interface associated with the second consumer.

In step 514, in some embodiments, a reason for offering the promotion may also be displayed on the second consumer interface. For example, a representation of the first consumer may be caused to be displayed on the second consumer interface, and it may be indicated that the promotion was derived from an interest indication received from the first consumer.

In step 516, in some embodiments, one or more commonalities or similarities between the first and second consumers may be displayed on the second consumer interface in relation to the promotion. For example, one or more common or similar profile data items and/or prior activity data may be displayed.

To provide greater consumer control over promotion recommendations, certain embodiments may enable a consumer to view, in a consumer interface displayed on a visual display device, the consumers associated with him/her in the consumer association database. In certain embodiments, the consumer may be enabled to edit the list of consumers associated with him/her, for example, by deleting entries of certain consumers from or adding entries of certain consumers to the consumer association database. Certain other embodiments may not enable consumers to view or edit the consumer association database.

Figure 6:
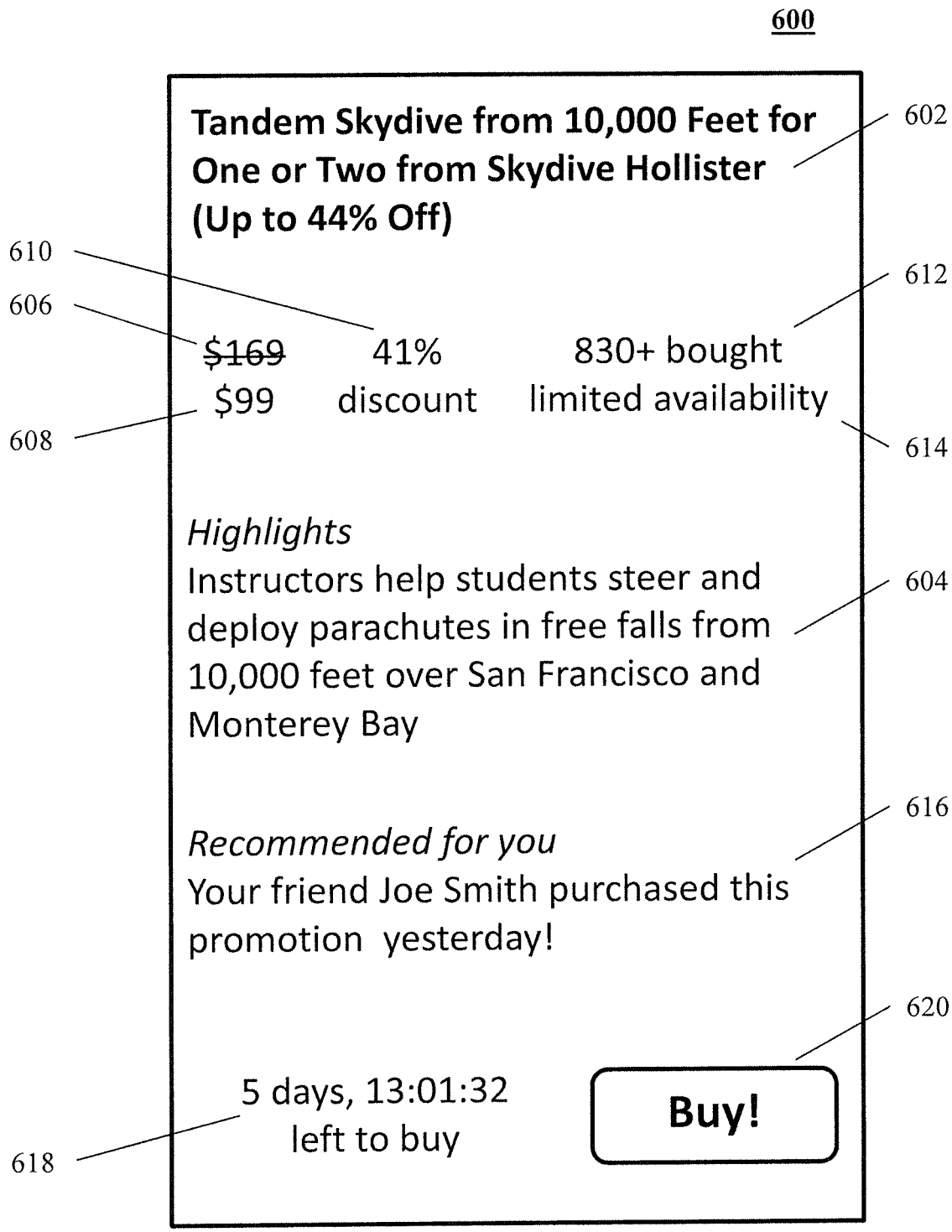
FIG. 6 is a schematic of an exemplary consumer interface associated with a consumer to render an impression of a promotion for viewing and possible purchase by the consumer.

FIG. 6 is a schematic of an exemplary consumer interface 600 associated with a consumer on which an impression of a promotion may be caused to be generated, as depicted in step 512 of FIG. 5. Exemplary consumer interface 600 provides an impression of a tandem skydive promotion. The impression may include introductory information 602 and detailed information 604 on the promotion, e.g., the subject matter of the promotion and the discount. The impression may also include the original price 606, the discounted price 608, the discount percentage 610, the number of consumers who purchased the promotion 612, and whether there is limited availability 614. The impression may also display a reason 616 for which the promotion is particularly recommended for the consumer using the consumer interface 600, for example, that a friend of the consumer purchased the promotion. The impression may also include a time deadline 618 for purchasing the promotion and a user input tool 620 (e.g., a "buy" button) for enabling the consumer to purchase the promotion.

Figure 7:
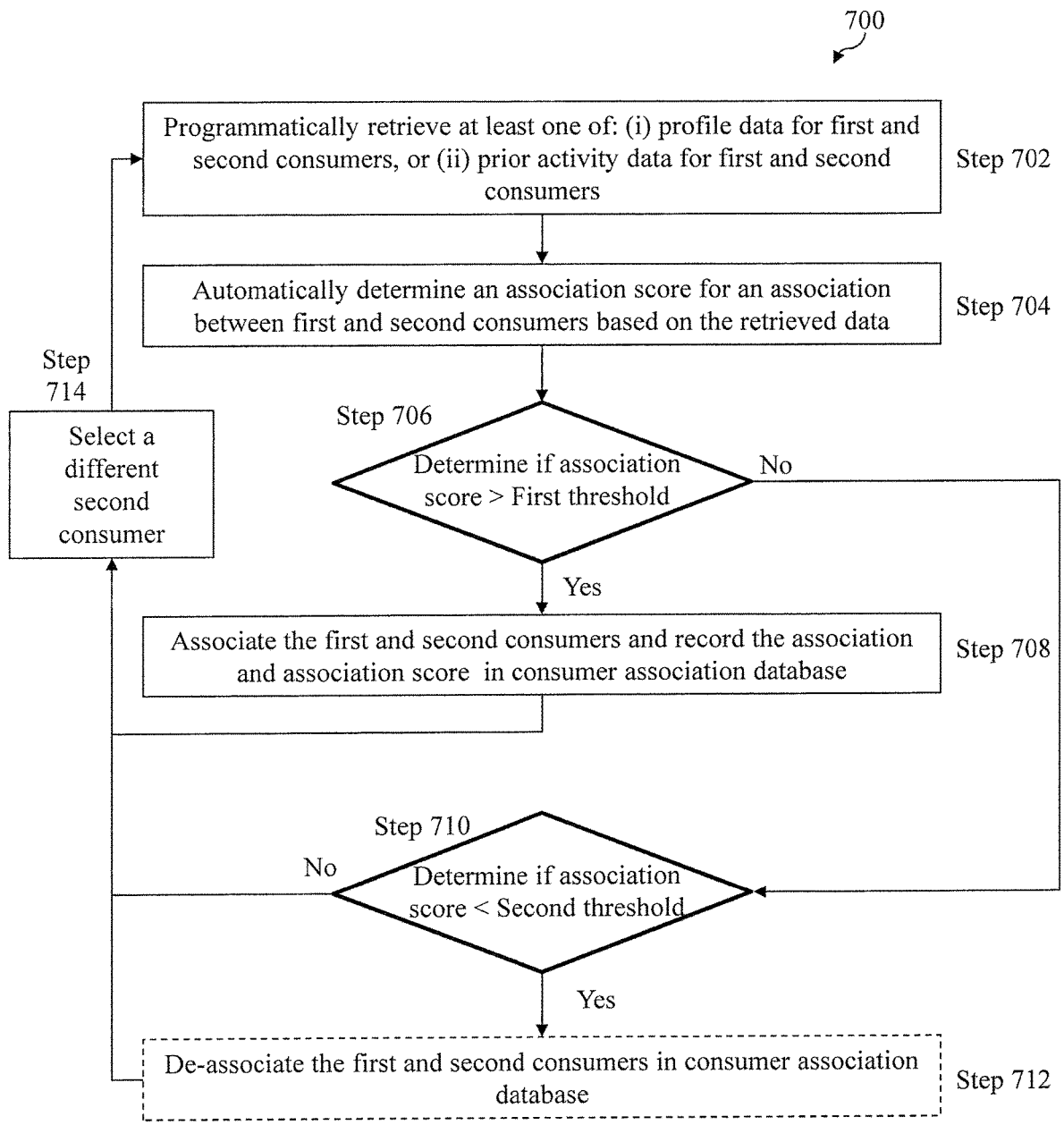
FIG. 7 is a flowchart illustrating an exemplary computer-executable method for determining a promotion sharing association between a first consumer and a second consumer.

FIG. 7 is a flowchart illustrating an exemplary computer-executable method 700 for programmatically generating a promotion sharing association between a first consumer and a second consumer, as depicted in step 506 of FIG. 5. In step 702, at least one of (i) profile data for the first and second consumers, or (ii) prior activity data for the first and second consumers, may be programmed retrieved.

Similarities between the profile data features of the first and second consumers may be analyzed to determine how relevant certain promotions offered to the first consumer may be to the second consumer, thereby generating similarity values corresponding to the profile data features. Similarities between the prior activity data of the first and second consumers may also be analyzed to determine how relevant certain promotions offered to the first consumer may be to the second consumer, thereby generating similarity values corresponding to the prior activity data. The similarity values generated may be combined in any suitable manner in step 704 to generate an association score between the consumers.

The profile data used in step 704 may include one or more data items from the profile of the consumers. Exemplary profile data items include, but are not limited to, age, gender, one or more geographical locations (e.g., a residential location of the consumer, a location of a promotion purchased by the consumer, etc.), a tenure of use of the promotion and marketing service, a price preference (e.g., a price range of promotions preferred by the consumer), a promotion category preference (e.g., a feature, category and/or sub-category of a promotion preferred by the consumer), a redemption preference (e.g., a preference of the consumer for promotions with certain redemption characteristics), an instrument preference (e.g., a preference of the consumer for promotions of certain instrument types), and the like.

For each profile data item, the corresponding values for the first and second consumers may be compared to determine a measure of similarity. As one example, for the "gender" profile data item, matching genders may result in a maximum similarity value of "1" and non-matching genders may result in a minimum similarity value of "0." As another example, for the "age" profile data item, a maximum similarity value of "1" may be generated if the first and second consumers fall into the same age range, and gradually reducing similarity values may be generated as the consumers diverge in their age ranges.

The prior activity data used in step 704 may include, but is not limited to, data on a viewing activity performed by a consumer in relation to a promotion, i.e., an activity performed to view a promotion on a consumer interface associated with the consumer. The viewing activity data may include data on the features, categories and/or sub-categories of promotions viewed by the consumer. The prior activity data may also include, but is not limited to, data on a purchase activity performed by a consumer in relation to a promotion, i.e., an activity performed to purchase a promotion offered to the consumer. The purchase activity data may include data on the features, categories and/or sub-categories of promotions purchased by the consumer. The prior activity data may also include data on a rating activity performed by a consumer in relation to a promotion. The promotion rating data may include data on the features, categories and/or sub-categories of promotions rated by the consumer.

In some example cases, the prior activity data may also include, but is not limited to, data on a percentage of promotions (and/or features, categories and sub-categories of the promotions) purchased by the first consumer and offered to the second consumer that were viewed by the second consumer. The prior activity data may also include, but is not limited to, data on a percentage of promotions (and/or features, categories and sub-categories of the promotions) purchased by the first consumer and offered to the second consumer that were not viewed by the second consumer. The prior activity data may also include, but is not limited to, data on a percentage of promotions (and/or features, categories and sub-categories of the promotions) purchased by the first consumer and offered to the second consumer that were purchased by the second consumer. The prior activity data may also include, but is not limited to, data on a percentage of promotions (and/or features, categories and sub-categories of the promotions) purchased by the first consumer and offered to the second consumer that were not purchased by the second consumer. The prior activity data may also include, but is not limited to, data on a percentage of promotions (and/or features, categories and sub-categories of the promotions) purchased by the first consumer and offered to the second consumer that were viewed but not purchased by the second consumer. The prior activity data may also include, but is not limited to, data on a percentage of promotions (and/or features, categories and sub-categories of the promotions) purchased by the first consumer and offered to the second consumer that were neither viewed nor purchased by the second consumer.

In step 704, an association score may be automatically determined based on the retrieved data. In some embodiments, only the profile data for the consumers may be used to determine the association score. In other embodiments, only the prior activity data may be used to determine the association score. In yet other embodiments, both the profile data and the prior activity data may be used to determine the association score. Certain exemplary non-limiting embodiments for generating the association score are illustrated in FIGS. 8-15.

In step 706, the method may determine if the association score exceeds a first higher threshold value. If the association score exceeds the first threshold value, in step 708, the method may generate a promotion sharing association between the first and second consumers, and store the promotion sharing association and the association score in a consumer association database. The promotion sharing association thus generated may subsequently be used to provide promotions to the first consumer and/or the second consumer as illustrated in FIG. 5. If the association score does not exceed the first threshold value, in step 710, the method may determine if the association score is lower than a second lower threshold value. If the association score is lower than the second threshold value, in some embodiments, the method may not generate a new promotion sharing association and may de-associate the first and second consumers in the consumer association database in step 712 (if a promotion sharing association was previously generated for the first and second consumers). If the association score is between the first and second thresholds, the method may not generate a new promotion sharing association between the first and second consumers, but may retain an existing promotion sharing association between the first and second consumers. Certain other exemplary embodiments may not perform steps 710 and 712.

Upon completion of steps 708, 710 and 712, a different second consumer may be selected from all consumers using the promotion and marketing service in step 714, and method 700 may be repeated to determine if a promotion sharing association should be generated between the first consumer and the newly selected second consumer.

Figure 8:
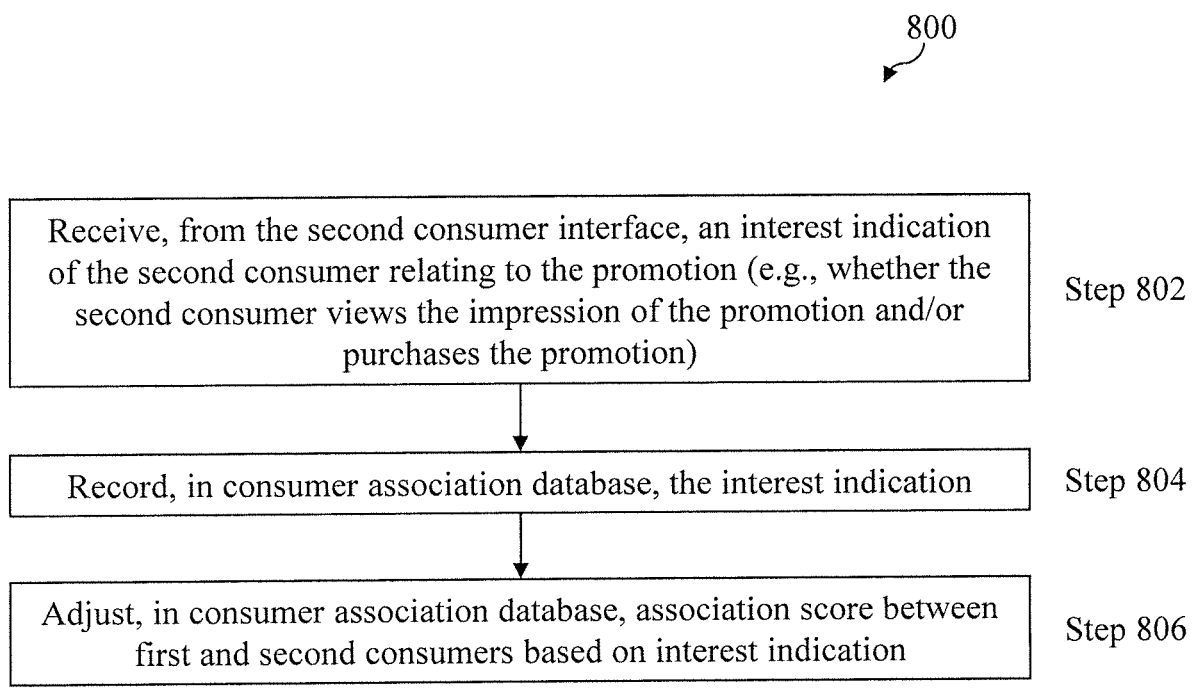
FIG. 8 is a flowchart illustrating an exemplary computer-executable method for adjusting an association score of a promotion sharing association between a first consumer and a second consumer.

FIG. 8 is a flowchart illustrating an exemplary computer-executable method 800 for adjusting an association score of an existing promotion sharing association between a first consumer and a second consumer. In step 802, an interest indication is received from a second consumer interface associated with the second consumer relating to a promotion offered by the method of FIG. 5 (that is, a promotion derived from the first consumer). The interest indication may include an indication that the second consumer viewed an impression of the promotion, rated the promotion, purchased the promotion, and the like. In step 804, the interest indication may be recorded, for example, in the consumer association database. In step 806, an existing association score for a promotion sharing association between the first and second consumers may be automatically adjusted based on the interest indication received. For example, in an exemplary embodiment using a social graph (such as the example illustrated in FIG. 9), a connection score of an edge connecting the first and second consumers may be adjusted based on the interest indication, and the adjusted connection score may be used to adjust the association score between the consumers.

In automatically determining an association between a first consumer and a second consumer for sharing of promotions, certain exemplary embodiments may generate and use a social graph which is a digital representation of promotion sharing activities connecting a plurality of consumers. In some embodiments, the social graph generator and processor circuitry 212 may use data in the historical database 110 to generate a social graph.

In a social graph, each consumer may be represented as a node, and one or more promotion sharing activities between two consumers may be represented as an edge or connection path connecting the nodes representing the consumers. A connection score representing a frequency and/or volume of promotion sharing activities performed between two consumers is associated with each edge in the social graph. Exemplary connection scores may be determined based on any suitable formula. In one embodiment, a connection score may be the sum of the number of promotion sharing activities performed between two consumers. In another embodiment, a connection score may be the weighted sum of the number of promotion sharing activities performed between two consumers. In this case, promotion sharing activities that resulted in subsequent purchase of the shared promotions may be given a higher weight than promotion sharing activities that did not result in subsequent purchase or viewing of the shared promotions. Similarly, promotion sharing activities that resulted in viewing of the shared promotions may be given a higher weight than promotion sharing activities that did not result in purchase or viewing of the shared promotions.

In certain embodiments, a single edge (and associated connection score) may be provided for all promotion sharing activities associated with two consumers. In certain other embodiments, a plurality of edges (and a plurality of associated connection scores) may be provided for promotion sharing activities associated with two consumers. In this case, each edge connecting the same two nodes may be associated with a particular category or characteristic of promotions shared between the two consumers.

Figure 9:
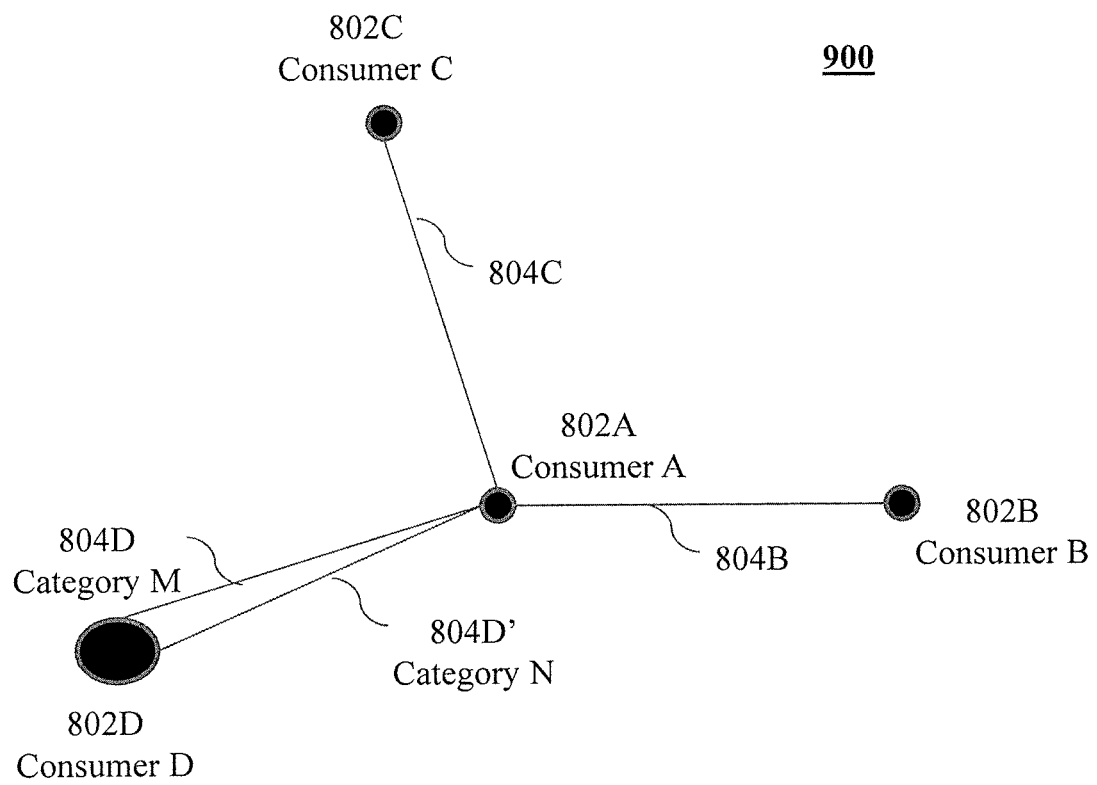
FIG. 9 is a schematic illustrating an exemplary partial social graph connecting a plurality of consumers using a promotion and marketing service.

FIG. 9 is a schematic illustrating an exemplary partial social graph 900 connecting a plurality of consumers A-D who use a promotion and marketing service. Social graph 900 includes nodes 902A, 902B, 902C and 902D representing consumers A, B, C and D, respectively. Edge 904B connecting nodes 902A and 902B represent one or more promotion sharing activities associated with consumers A and B. Edge 904C connecting nodes 902A and 902C represent one or more promotion sharing activities associated with consumers A and C. Edges 904D and 904D' connecting nodes 902A and 902D represent one or more promotion sharing activities associated with consumers A and D. Edge 904D may be associated with a first category (M) of promotions shared between consumers A and D. Edge 904D' may be associated with a second category (N) of promotions shared between consumers A and D.

Figure 10:
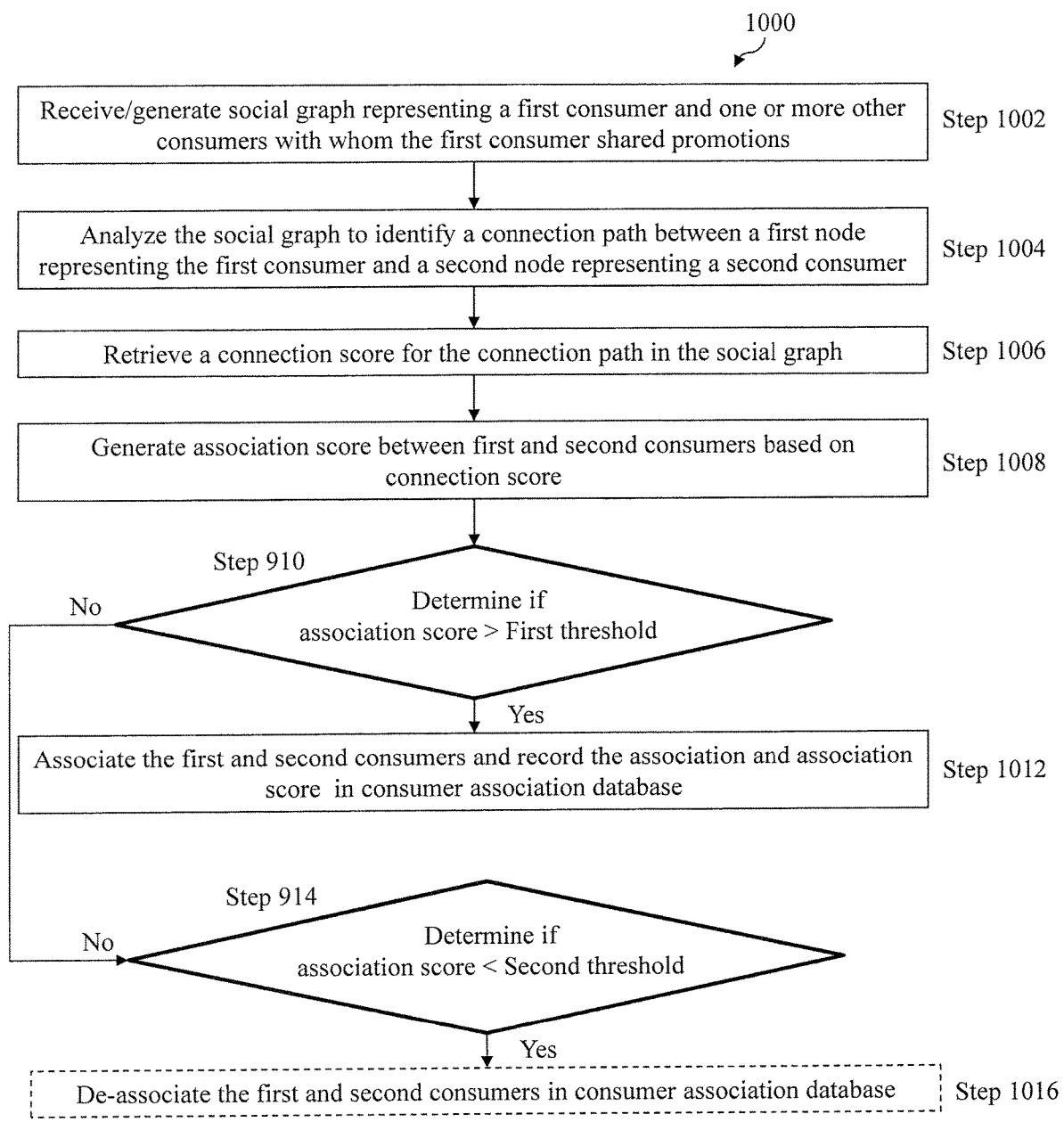
FIG. 10 is a flowchart illustrating an exemplary computer-executable method for using a social graph in determining a promotion sharing association between a first consumer and a second consumer.

FIG. 10 is a flowchart illustrating an exemplary computer-executable method 1000 for using a social graph in programmatically generating a promotion sharing association between a first consumer and a second consumer. In step 1002, a digital representation of a social graph may be received, for example, from storage on a memory or a computer-readable medium. Alternatively, a digital representation of the social graph may be generated using prior promotion sharing activities performed by consumers. The social graph may be a complete social graph of all consumers who use the promotion and marketing service, or a partial graph representing the promotion sharing activities of a first consumer.

In step 1004, the social graph may be analyzed to identify an edge or connection path between a first node representing the first consumer and a second node representing a second consumer.

In step 1006, a connection score associated with the edge may be retrieved from the social graph.

In step 1008, an association score may be generated based on the connection score. In one embodiment, the association score may be set to the connection score. In other embodiments, the association score may account for the connection score and one or more other factors, for example, similarities in profile data of the first and second consumers (e.g., whether the consumers fall in the same age category, whether the consumers are of the same gender, whether the consumers reside in the same geographical area).

In step 1010, the method may determine if the association score exceeds a first higher threshold value. If the association score exceeds the first threshold value, in step 1012, the method may generate a promotion sharing association between the first and second consumers, and store the association and the association score in a consumer association database. The promotion sharing association thus generated may subsequently be used to provide promotions to the first consumer and/or the second consumer as illustrated in FIG. 5. If the association score does not exceed the first threshold value, in step 1014, the method may determine if the association score is lower than a second lower threshold value. If the association score is lower than the second threshold value, in some embodiments, the method may not generate a new promotion sharing association and may de-associate the first and second consumers in the consumer association database in step 1016 (if a promotion sharing association was previously generated for the first and second consumers). If the association score is between the first and second thresholds, the method may not generate a new promotion sharing association between the first and second consumers, but may retain an existing promotion sharing association between the first and second consumers. Certain other exemplary embodiments may not perform steps 1014 and 1016.

In automatically determining a promotion sharing association between a first consumer and a second consumer for sharing of promotions, certain exemplary embodiments may generate and use a taste graph which is a digital representation of commonalities in promotion interests among a plurality of consumers. In some embodiments, the taste graph generator and processor circuitry 214 may use data in the historical database 110 to generate a taste graph.

In a taste graph, each consumer may be represented as a node, and similarities in promotions purchased by two consumers may be represented as an edge or path connecting the nodes representing the consumers. Two or more promotions may be similar in price, geographical location of the merchant, category, sub-category, and the like. A relevancy score representing the extent of similarities between the promotions purchased by two consumers is associated with each edge in the taste graph. In certain embodiments, a single edge (and associated relevancy score) may be provided for all promotions purchased by two consumers. In certain other embodiments, a plurality of edges (and a plurality of associated relevancy scores) may be provided for promotions purchased by two consumers. In this case, each edge connecting the same two nodes may be associated with a particular category of promotions purchased by the two consumers.

Figure 11:
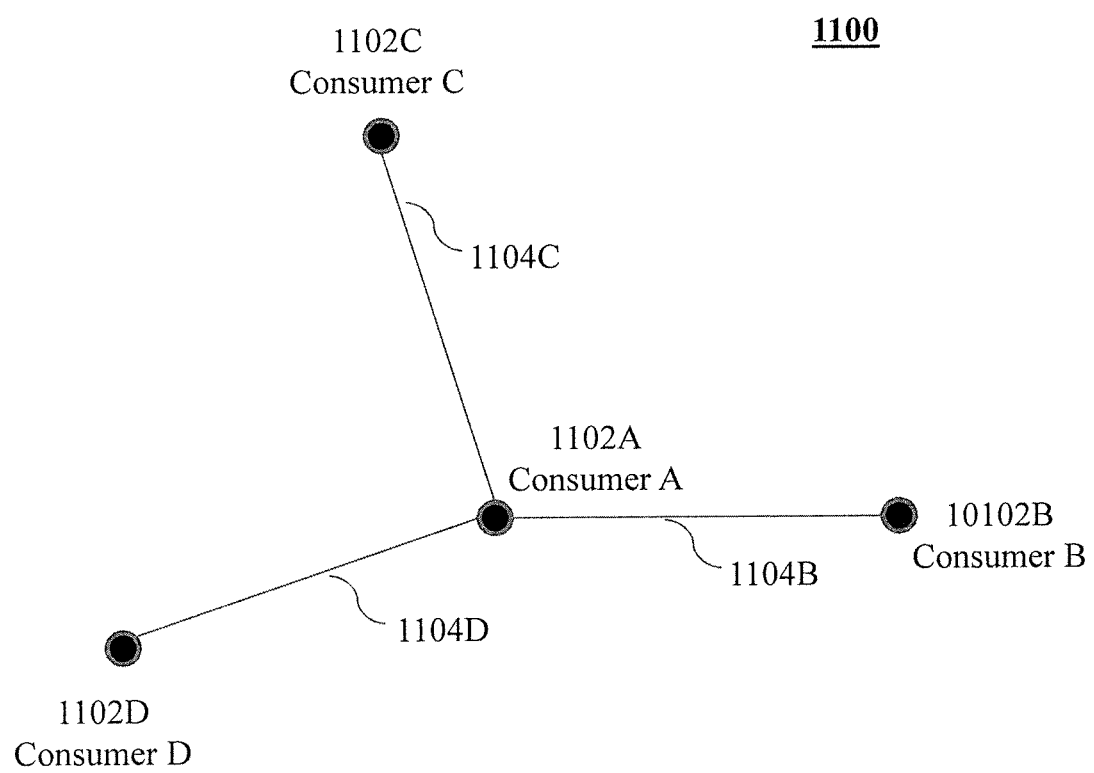
FIG. 11 is a schematic illustrating an exemplary partial taste graph connecting a plurality of consumers using a promotion and marketing service.

FIG. 11 is a schematic illustrating an exemplary partial taste graph 1100 connecting a plurality of consumers A-D who use a promotion and marketing service. Taste graph 1100 includes nodes 1102A, 1102B, 1102C and 1102D representing consumers A, B, C and D, respectively. Edge 1104B connecting nodes 1102A and 1102B represents similarities between promotions purchased by both consumers A and B. Edge 1104C connecting nodes 1102A and 1102C represents similarities between promotions purchased by both consumers A and C. Edge 1104D connecting nodes 1102A and 1102D represents similarities between promotions purchased by both consumers A and D.

Figure 12:
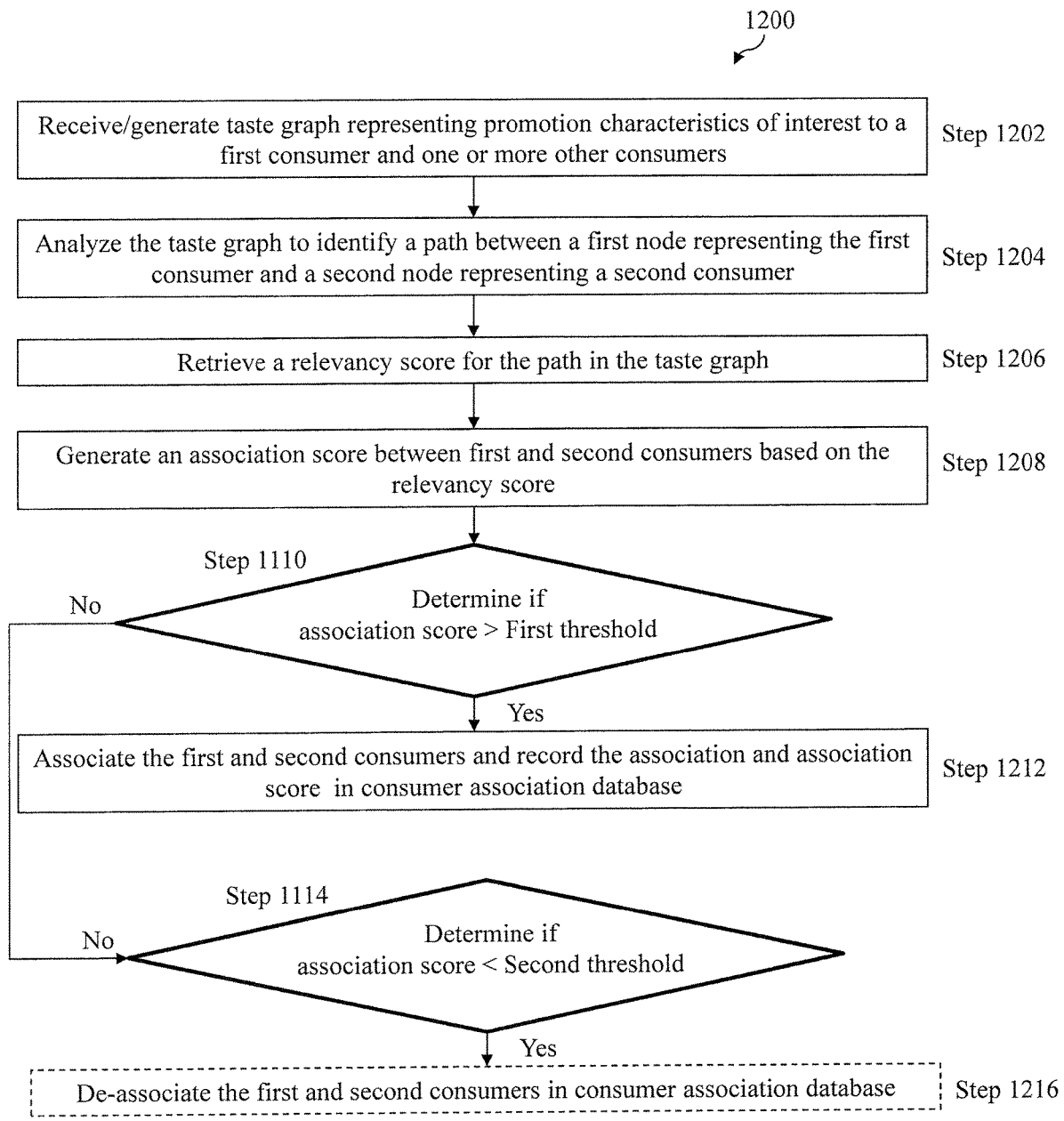
FIG. 12 is a flowchart illustrating an exemplary computer-executable method for using a taste graph in determining a promotion sharing association between a first consumer and a second consumer.

FIG. 12 is a flowchart illustrating an exemplary computer-executable method 1200 for using a taste graph in programmatically generating a promotion sharing association between a first consumer and a second consumer. In step 1202, a digital representation of a taste graph may be received, for example, from storage on a memory or a computer-readable medium. Alternatively, a digital representation of the taste graph may be generated using prior activity data, for example, data on promotion purchases and/or promotion ratings performed by consumers. The taste graph may be a complete taste graph of all consumers who use the promotion and marketing service, or a partial graph representing prior activities of a first consumer and how similar the corresponding promotions are to those purchased and/or rated by other consumers In step 1204, the taste graph may be analyzed to identify an edge between a first node representing the first consumer and a second node representing a second consumer.

In step 1206, a relevancy score associated with the edge may be retrieved from the taste graph.

In step 1208, an association score may be generated based on the relevancy score. In one embodiment, the association score may be set to the relevancy score. In other embodiments, the association score may account for the relevancy score and one or more other factors, for example, similarities in profile data of the first and second consumers (e.g., whether the consumers fall in the same age category, whether the consumers are of the same gender, whether the consumers reside in the same geographical area).

In step 1210, the method may determine if the association score exceeds a first higher threshold value. If the association score exceeds the first threshold value, in step 1212, the method may generate a promotion sharing association between the first and second consumers, and store the association and the association score in a consumer association database. The promotion sharing association thus generated may subsequently be used to provide promotions to the first consumer and/or the second consumer as illustrated in FIG. 5. If the association score does not exceed the first threshold value, in step 1214, the method may determine if the association score is lower than a second lower threshold value. If the association score is lower than the second threshold value, in some embodiments, the method may not generate a new promotion sharing association and may de-associate the first and second consumers in the consumer association database in step 1216 (if a promotion sharing association was previously generated for the first and second consumers). If the association score is between the first and second thresholds, the method may not generate a new promotion sharing association between the first and second consumers, but may retain an existing promotion sharing association between the first and second consumers. Certain other exemplary embodiments may not perform steps 1214 and 1216.

In automatically determining a promotion sharing association between a first consumer and a second consumer, certain other exemplary embodiments may generate and use both a social graph and a taste graph. FIG. 13 is a flowchart illustrating an exemplary computer-executable method 1300 for using a social graph and a taste graph in programmatically generating a promotion sharing association between a first consumer and a second consumer.

In step 1302, a digital representation of a social graph may be received or generated.

In step 1304, a digital representation of a taste graph may be received or generated.

In step 1306, the social graph may be analyzed to identify an edge between a first node representing the first consumer and a second node representing a second consumer.

In step 1308, a connection score associated with the edge may be retrieved from the social graph.

In step 1310, the taste graph may be analyzed to identify an edge between a first node representing the first consumer and a second node representing the same second consumer referenced in step 1308.

In step 1312, a relevancy score associated with the edge may be retrieved from the taste graph.

In step 1314, an association score may be generated based on the connection score and the relevancy score. In some embodiments, the association score may be set to the average or the sum of the connection score and the relevancy score. In other embodiments, the association score may be set to the weighted average or the weighted sum of the connection score and the relevancy score. The weights may be set to any desired values to depict the relative importance of the connection score and the relevancy score. In other embodiments, the association score may also account for one or more other factors, for example, similarities in profile data of the first and second consumers (e.g., whether the consumers fall in the same age category, whether the consumers are of the same gender, whether the consumers reside in the same geographical area).

In step 1316, the method may determine if the association score exceeds a first higher threshold value. If the association score exceeds the first threshold value, in step 1318, the method may generate a promotion sharing association between the first and second consumers, and store the promotion sharing association and the association score in a consumer association database. The promotion sharing association thus generated may subsequently be used to provide promotions to the first consumer and/or the second consumer as illustrated in FIG. 5. If the association score does not exceed the first threshold value, in step 1320, the method may determine if the association score is lower than a second lower threshold value. If the association score is lower than the second threshold value, in some embodiments, the method may not generate a new promotion sharing association and may de-associate the first and second consumers in the consumer association database in step 1322 (if a promotion sharing association was previously generated for the first and second consumers). If the association score is between the first and second thresholds, the method may not generate a new promotion sharing association between the first and second consumers, but may retain an existing promotion sharing association between the first and second consumers. Certain other exemplary embodiments may not perform steps 1320 and 1322.

In automatically determining a promotion sharing association between a first consumer and a second consumer, certain exemplary embodiments may use a machine learning system implemented on and executed by a computer system or encoded on a non-transitory computer-readable medium. FIG. 14 is a flowchart illustrating an exemplary computer-executable method 1400 for training and using a machine learning system in programmatically generating a promotion sharing association between a first consumer and a second consumer. The promotion sharing association thus generated may subsequently be used to provide promotions to the first consumer and/or the second consumer as illustrated in FIG. 5. In step 1402, a reference corpus may be received or created/compiled, including consumer profile data and prior activity data of the consumers. The reference corpus may also include, for each pair of consumers associated in a consumer association database, a pairwise association score.

In step 1404, the pairwise association scores above a predetermined threshold value may be segregated as being "positive" examples, and the remaining pairwise association scores may be segregated as being "negative" examples. Any suitable metric may be selected as qualification for being a "positive" example, and a corresponding threshold value may be selected. For example, only those promotion sharing associations that generate "successful" promotion recommendations may be considered as "positive examples." In this case, a "successful" promotion recommendation may be a promotion derived from a first consumer and offered to a second consumer that was purchased by the second consumer.

In step 1406, the positive and negative examples in the reference corpus may be used to train and test a machine learning module or system.

In step 1408, the trained machine learning module or system may be used to determine pairwise association scores between two consumers to determine if the consumers should be associated in a consumer association database.

Although "pairwise" association scores are described for illustrative purposes, one or more associations may include more than two consumers. Association scores for such associations, although not "pairwise," may be used in accordance with exemplary embodiments.

FIG. 15 is a flowchart illustrating an exemplary computer-executable method 1500 for training the machine learning system referenced in FIG. 14. In step 1502, pairwise consumer training examples may be selected in the reference corpus, the remaining examples to be used as testing examples. In step 1504, for each training example, a multidimensional vector may be generated using the profile and activity data of each consumer in a space visualized based on the different data elements in the profile and activity data. In step 1506, the method may determine a measure of similarity between the two vectors formed. In step 1508, the machine learning algorithm may be programmatically executed to relate the vector similarities of the training examples to probabilities that the training examples are "positive" or "negative" examples.

Figure 16:
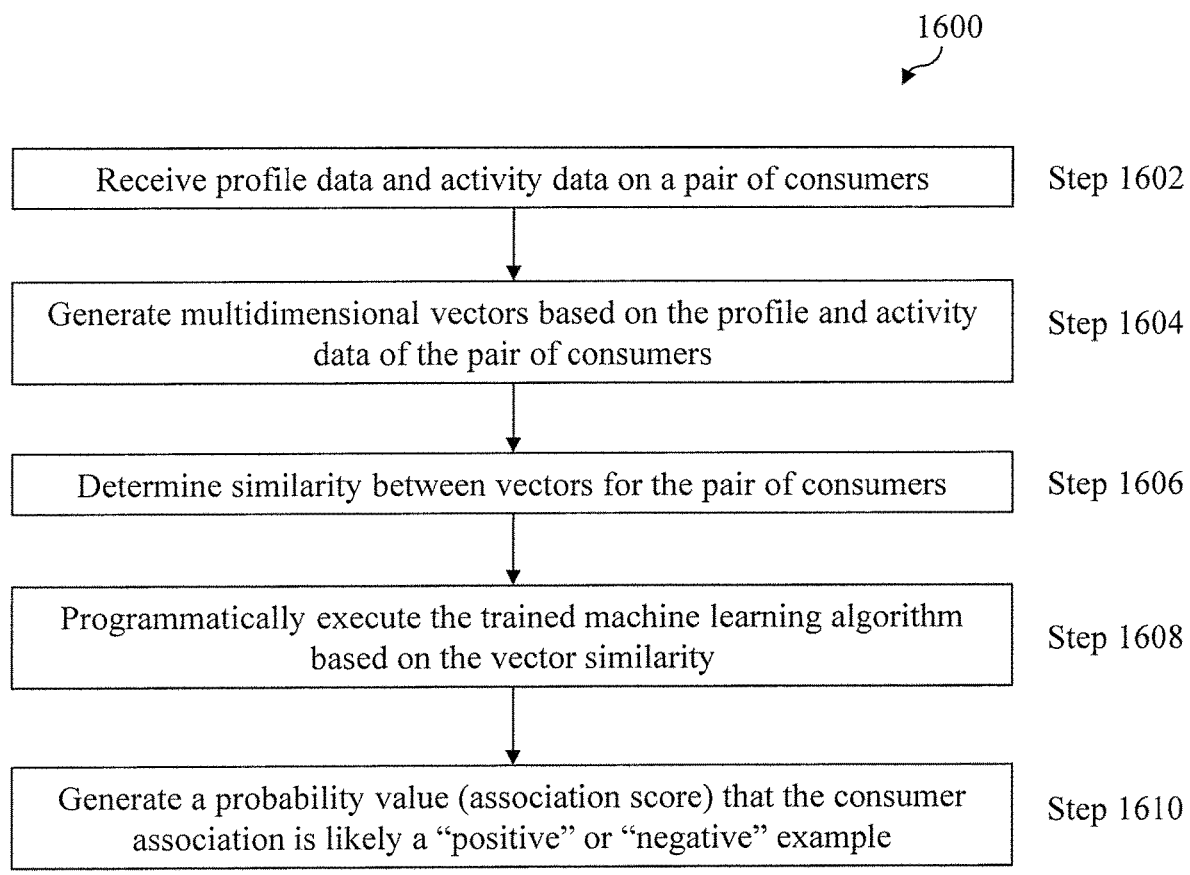
FIG. 16 is a flowchart illustrating an exemplary computer-executable method for using a trained machine learning system in determining an association score for a promotion sharing association between a first consumer and a second consumer.

FIG. 16 is a flowchart illustrating an exemplary computer-executable method 1600 for using a trained machine learning system in programmatically generating an association score for a promotion sharing association between a first consumer and a second consumer. In step 1602, consumer profile data and prior consumer activity data may be received on a pair of consumers, for example, from a historical database 110. In step 1604, a multidimensional vector may be generated using the profile and activity data of each consumer in a space visualized based on the different data elements in the profile and activity data. In step 1606, the method may determine a measure of similarity between the two vectors formed. In step 1608, the trained machine learning algorithm in the machine learning module may be programmatically executed based on the vector similarity. In step 1610, the machine learning algorithm may generate a probability value indicating whether the vector similarity indicates that the promotion sharing association is likely to be a "positive" or "negative" example. The probability value may be selected as a pairwise association score in some embodiments. In some embodiments, a promotion sharing association may be generated if the association score exceeds a threshold value.

Exemplary Computing Devices

Systems and methods disclosed herein may include one or more programmable processing units having associated therewith executable instructions held on one or more computer readable media, RAM, ROM, hard drive, and/or hardware. In exemplary embodiments, the hardware, firmware and/or executable code may be provided, for example, as upgrade module(s) for use in conjunction with existing infrastructure (for example, existing devices/processing units). Hardware may, for example, include components and/or logic circuitry for executing the embodiments taught herein as a computing process.

Displays and/or other feedback means may also be included, for example, for rendering a graphical user interface, according to the present disclosure. The display and/or other feedback means may be stand-alone equipment or may be included as one or more components/modules of the processing unit(s).

The actual software code or control hardware which may be used to implement some of the present embodiments is not intended to limit the scope of such embodiments. For example, certain aspects of the embodiments described herein may be implemented in code using any suitable programming language type such as, for example, assembly code, C, C# or C++ using, for example, conventional or object-oriented programming techniques. Such code is stored or held on any type of suitable non-transitory computer-readable medium or media such as, for example, a magnetic or optical storage medium.

As used herein, a "processor," "processing unit," "computer" or "computer system" may be, for example, a wireless or wire line variety of a microcomputer, minicomputer, server, mainframe, laptop, personal data assistant (PDA), wireless e-mail device (for example, "BlackBerry," "Android" or "Apple," trade-designated devices), cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), flash memory storage devices, or the like.

Figure 17:
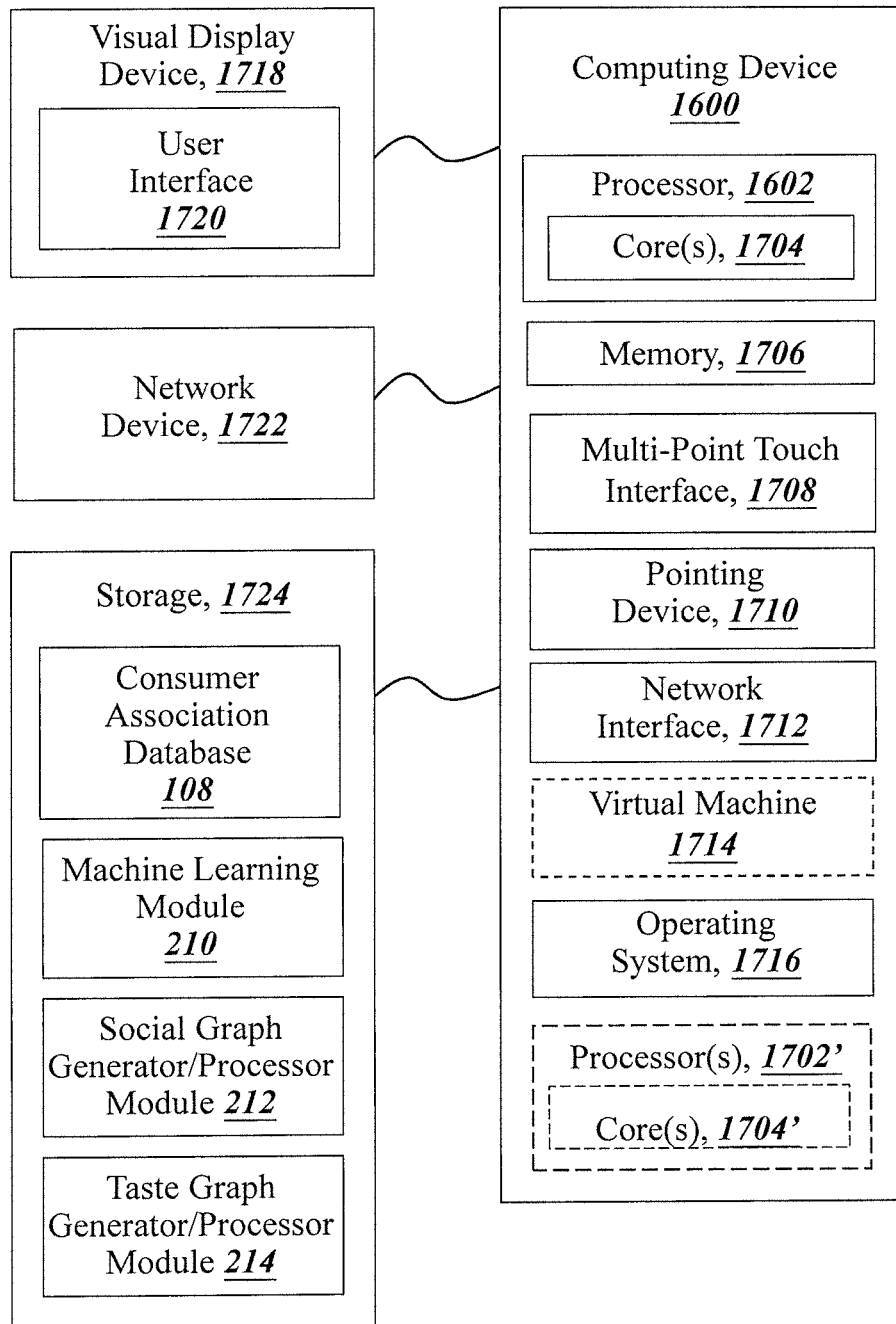
FIG. 17 is a block diagram of an exemplary computing device that may be used to implement and execute exemplary computer-executable methods.

FIG. 17 depicts a block diagram representing an exemplary computing device 1700 that may be used to implement the systems and methods disclosed herein. The computing device 1700 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. In exemplary embodiments, a distributed computational system may include a plurality of such computing devices.

The computing device 1700 includes one or more non-transitory computer-readable media having encoded thereon one or more computer-executable instructions or software for implementing the exemplary methods described herein. The non-transitory computer-readable media may include, but are not limited to, one or more types of hardware memory and other tangible media (for example, one or more magnetic storage disks, one or more optical disks, one or more USB flash drives), and the like. For example, memory 1706 included in the computing device 1700 may store computer-readable and computer-executable instructions or software for implementing a graphical user interface as described herein. The computing device 1700 also includes processor 1702 and associated core 1704, and in some embodiments, one or more additional processor(s) 1702' and associated core(s) 1704' (for example, in the case of computer systems having multiple processors/cores), for executing computer-readable and computer-executable instructions or software stored in the memory 1702 and other programs for controlling system hardware. Processor 1702 and processor(s) 1702' may each be a single core processor or a multiple core (1704 and 1704') processor.

Virtualization may be employed in the computing device 1700 so that infrastructure and resources in the computing device may be shared dynamically. A virtual machine 1714 may be provided to handle a process running on multiple processors so that the process appears to be using only one computing resource rather than multiple computing resources. Multiple virtual machines may also be used with one processor.

Memory 1706 may include a computer system memory or random access memory, such as DRAM, SRAM, EDO RAM, and the like. Memory 1706 may include other types of memory as well, or combinations thereof.

A user may interact with the computing device 1700 through a visual display device 1718, such as a screen or monitor, which may display one or more graphical user interfaces 1720 provided in accordance with exemplary embodiments described herein. The visual display device 1718 may also display other aspects, elements and/or information or data associated with exemplary embodiments.

The computing device 1700 may include other I/O devices for receiving input from a user, for example, a keyboard or any suitable multi-point touch interface 1708 or pointing device 1710 (e.g., a mouse, a user's finger interfacing directly with a display device). As used herein, a "pointing device" is any suitable input interface, specifically, a human interface device, that allows a user to input spatial data to a computing system or device. In an exemplary embodiment, the pointing device may allow a user to provide input to the computer using physical gestures, for example, pointing, clicking, dragging, dropping, and the like. Exemplary pointing devices may include, but are not limited to, a mouse, a touchpad, a finger of the user interfacing directly with a display device, and the like.

The keyboard 1708 and the pointing device 1710 may be coupled to the visual display device 1718. The computing device 1700 may include other suitable conventional I/O peripherals. The I/O devices may facilitate implementation of the one or more graphical user interfaces 1720, for example, implement one or more of the graphical user interfaces described herein.

The computing device 1700 may include one or more storage devices 1724, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement exemplary embodiments as taught herein. In exemplary embodiments, the one or more storage devices 1724 may provide storage for data that may be generated by the systems and methods of the present disclosure. For example, a storage device 1724 may provide storage for a consumer association database or any suitable data storage structure 108 that stores data indicating promotion sharing associations among consumers. In some embodiments, a storage device 1724 may provide storage for a machine learning circuitry 210 implementing a machine learning algorithm configured to perform the methods illustrated in FIGS. 13-14. In some embodiments, a storage device 1724 may provide storage for a social graph generator and processor circuitry 212 implementing one or more computer-executable instructions to perform the methods illustrated in FIGS. 9 and 12. In some embodiments, a storage device 1724 may provide storage for a taste graph generator and processor circuitry 214 implementing one or more computer-executable instructions to perform the methods illustrated in FIGS. 11 and 12. The one or more storage devices 1724 may be provided on the computing device 1700 and/or provided separately or remotely from the computing device 1700. The exemplary components depicted as being stored on storage device 1724 may be stored on the same or on different storage devices.

The computing device 1700 may include a network interface 1712 configured to interface via one or more network devices 1722 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1712 may include a built-in network adapter, network interface card, PCMCIA network card, card bus network adapter, wireless network adapter, USB network adapter, modem or any other device suitable for interfacing the computing device 1700 to any type of network capable of communication and performing the operations described herein. The network device 1722 may include one or more suitable devices for receiving and transmitting communications over the network including, but not limited to, one or more receivers, one or more transmitters, one or more transceivers, one or more antennae, and the like.

The computing device 1700 may run any operating system 1716, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1716 may be run in native mode or emulated mode. In an exemplary embodiment, the operating system 1716 may be run on one or more cloud machine instances.

One of ordinary skill in the art will recognize that exemplary computing device 1700 may include more or fewer modules than those shown in FIG. 17.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by $\frac{1}{20}$th, $\frac{1}{10}$th, $\frac{1}{5}$th, $\frac{1}{3}$rd, $\frac{1}{2}$nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions. Exemplary systems may include more or fewer modules than those illustrated in the exemplary block diagrams.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-executable method for associating a plurality of consumers using a promotion and marketing service, the computer-executable method comprising:
    programmatically retrieving one or more profile data features associated with a first consumer;
    programmatically retrieving one or more profile data features associated with a second consumer;

programmatically retrieving data on one or more prior activities performed by the first consumer and the second consumer in relation to one or more prior promotions offered to the first consumer and the second consumer, wherein the data on one or more prior activities is generated based at least on clickstream data received from a first input at a first graphical user interface of a first consumer device associated with the first consumer and a second input at a second graphical user interface of a second consumer device associated with the second consumer;

automatically generating, using circuitry provided on a computing device, an association between the first consumer and the second consumer, wherein generating the association between the first consumer and the second consumer comprises:

analyzing a social graph to identify a connection path connecting a first node representing the first consumer and a second node representing the second consumer;

retrieving a connection score for the connection path, the connection score representing an estimated strength of connection between the first consumer and the second consumer, the connection score based on the one or more prior activities performed by the first consumer in relation to the one or more prior promotions and the one or more prior activities performed by the second consumer in relation to the one or more prior promotions;

analyzing a taste graph to identify a path connecting a first node representing the first consumer and a second node representing the second consumer;

retrieving a relevancy score for the path, the relevancy score representing an estimated relevancy of promotion interests between the first consumer and the second consumer, the relevancy score based on the one or more profile data features associated with the first consumer and the one or more profile data features associated with the second consumer;

generating, via a machine learning model, an association score related to the association between the first consumer and the second consumer based on the connection score and the relevancy score, wherein generating the association score via the machine learning model comprises generating a multidimensional vector for the first consumer and the second consumer and comparing the multidimensional vector for the first consumer and the multidimensional vector for the second consumer to determine a measure of similarity and programmatically executing a machine learning algorithm to relate the measure of similarity to a probability that the association score between the first consumer and the second consumer is positive or negative; and generating the association between the first consumer and the second consumer in response to the association score exceeding a predetermined threshold score; and recording the association between the first consumer and the second consumer in a consumer association database stored on a non-transitory computer-readable medium.

2. The computer-executable method of claim 1, further comprising:

receiving user input from a first consumer interface associated with the first consumer, the user input indicating purchase of a first promotion by the first consumer or a willingness of the first consumer to purchase the first promotion;

programmatically retrieving, from the consumer association database stored on the non-transitory computer-readable medium, the association between the first consumer and the second consumer; and automatically causing a second impression of the first promotion to be generated on a second consumer interface associated with the second consumer.

3. The computer-executable method of claim 2, further comprising:

receiving, from the second consumer interface, user input from the second consumer performing an activity relating to the first promotion, the activity comprising a viewing activity or a purchase activity; and automatically adjusting an association score for the association between the first consumer and the second consumer based on the activity.

4. The computer-executable method of claim 1, further comprising:

receiving user input from a first consumer interface associated with the first consumer, the user input indicating purchase of a first promotion by the first consumer or a willingness of the first consumer to purchase the first promotion;

programmatically retrieving, from the consumer association database stored on the non-transitory computer-readable medium, the association between the first consumer and the second consumer;

automatically causing a second impression of the first promotion to be generated on a second consumer interface associated with the second consumer;

receiving, from a second consumer interface, user input from the second consumer performing an activity relating to a first promotion, the activity comprising a viewing activity or a purchase activity; and automatically adjusting the connection score between the first node and the second node based on the activity.

5. The computer-executable method of claim 1, further comprising:

recording the association score in the consumer association database.

6. The computer-executable method of claim 1, wherein generating the association between the first consumer and the second consumer comprises:

using a trained machine learning system implementing a machine learning algorithm embodied on one or more computer-readable media, processing the one or more profile data features and the data on the one or more prior activities to determine a likelihood that the second consumer will purchase promotions purchased by the first consumer;

generating the association between the first consumer and the second consumer if the likelihood exceeds a predetermined threshold value;

generating an association score associated with the first consumer and the second consumer based on the likelihood; and recording the association score in the consumer association database.

7. One or more non-transitory computer-readable media having encoded thereon one or more computer-executable instructions for performing a method for associating a plurality of consumers using a promotion and marketing service, the method comprising:

programmatically retrieving one or more profile data features associated with a first consumer;

programmatically retrieving one or more profile data features associated with a second consumer;

programmatically retrieving data on one or more prior activities performed by the first consumer and the second consumer in relation to one or more prior promotions offered to the first consumer and the second consumer, wherein the data on one or more prior activities is generated based at least on clickstream data received from a first input at a first graphical user interface of a first consumer device associated with the first consumer and a second input at a second graphical user interface of a second consumer device associated with the second consumer;

automatically generating an association between the first consumer and the second consumer, wherein generating the association between the first consumer and the second consumer comprises:

analyzing a social graph to identify a connection path connecting a first node representing the first consumer and a second node representing the second consumer;

retrieving a connection score for the connection path, the connection score representing an estimated strength of connection between the first consumer and the second consumer, the connection score based on the one or more prior activities performed by the first consumer in relation to the one or more prior promotions and the one or more prior activities performed by the second consumer in relation to the one or more prior promotions;

analyzing a taste graph to identify a path connecting a first node representing the first consumer and a second node representing the second consumer;

retrieving a relevancy score for the path, the relevancy score representing an estimated relevancy of promotion interests between the first consumer and the second consumer, the relevancy score based on the one or more profile data features associated with the first consumer and the one or more profile data features associated with the second consumer;

generating, via a machine learning model, an association score related to the association between the first consumer and the second consumer based on the connection score and the relevancy score, wherein generating the association score via the machine learning model comprises generating a multidimensional vector for the first consumer and the second consumer and comparing the multidimensional vector for the first consumer and the multidimensional vector for the second consumer to determine a measure of similarity and programmatically executing a machine learning algorithm to relate the measure of similarity to a probability that the association score between the first consumer and the second consumer is positive or negative; and generating the association between the first consumer and the second consumer in response to the association score exceeding a predetermined threshold score; and recording the association between the first consumer and the second consumer in a consumer association database stored on the one or more non-transitory computer-readable medium.

8. The one or more non-transitory computer-readable media of claim 7, further comprising computer-executable instructions for:

receiving user input from a first consumer interface associated with the first consumer, the user input indicating purchase of a first promotion by the first consumer or a willingness of the first consumer to purchase the first promotion;

programmatically retrieving, from the consumer association database stored on the non-transitory computer-readable medium, the association between the first consumer and the second consumer; and automatically causing a second impression of the first promotion to be generated on a second consumer interface associated with the second consumer.

9. The one or more non-transitory computer-readable media of claim 8, further comprising computer-executable instructions for:

receiving, from the second consumer interface, user input from the second consumer performing an activity relating to the first promotion, the activity comprising a viewing activity or a purchase activity; and automatically adjusting an association score for the association between the first consumer and the second consumer based on the activity.

10. The one or more non-transitory computer-readable media of claim 7, further comprising computer-executable instructions for:

receiving user input from a first consumer interface associated with the first consumer, the user input indicating purchase of a first promotion by the first consumer or a willingness of the first consumer to purchase the first promotion;

programmatically retrieving, from the consumer association database stored on the non-transitory computer-readable medium, the association between the first consumer and the second consumer;

automatically causing a second impression of the first promotion to be generated on a second consumer interface associated with the second consumer;

receiving, from a second consumer interface, user input from the second consumer performing an activity relating to a first promotion, the activity comprising a viewing activity or a purchase activity; and automatically adjusting the connection score between the first node and the second node based on the activity.

11. The one or more non-transitory computer-readable media of claim 7, wherein generating the association between the first consumer and the second consumer comprises:

using a trained machine learning system implementing a machine learning algorithm embodied on one or more computer-readable media, processing the one or more profile data features and the data on the one or more prior activities to determine a likelihood that the second consumer will purchase promotions purchased by the first consumer;

generating the association between the first consumer and the second consumer if the likelihood exceeds a predetermined threshold value;

generating an association score associated with the first consumer and the second consumer based on the likelihood; and recording the association score in the consumer association database.

12. A system comprising:

a storage device configured to store a consumer association database; and processing circuitry configured to:
programmatically retrieve one or more profile data features associated with a first consumer;
    programmatically retrieving one or more profile data features associated with a second consumer;
    programmatically retrieve data on one or more prior activities performed by the first consumer and the second consumer in relation to one or more prior promotions offered to the first consumer and the second consumer, wherein the data on one or more prior activities is generated based at least on click-stream data received from a first input at a first graphical user interface of a first consumer device associated with the first consumer and a second input at a second graphical user interface of a second consumer device associated with the second consumer;
    automatically generate, using circuitry provided on a computing device, an association between the first consumer and the second consumer, wherein generating the association between the first consumer and the second consumer comprises:
        analyzing a social graph to identify a connection path connecting a first node representing the first consumer and a second node representing the second consumer;
        retrieving a connection score for the connection path, the connection score representing an estimated strength of connection between the first consumer and the second consumer, the connection score based on the one or more prior activities performed by the first consumer in relation to the one or more prior promotions and the one or more prior activities performed by the second consumer in relation to the one or more prior promotions;
        analyzing a taste graph to identify a path connecting a first node representing the first consumer and a second node representing the second consumer;
        retrieving a relevancy score for the path, the relevancy score representing an estimated relevancy of promotion interests between the first consumer and the second consumer, the relevancy score based on the one or more profile data features associated with the first consumer and the one or more profile data features associated with the second consumer;
        generating, via a machine learning model, an association score related to the association between the first consumer and the second consumer based on the connection score and the relevancy score, wherein generating the association score via the machine learning model comprises generating a multidimensional vector for the first consumer and the second consumer and comparing the multidimensional vector for the first consumer and the multidimensional vector for the second consumer to determine a measure of similarity and programmatically executing a machine learning algorithm to relate the measure of similarity to a probability that the association score between the first consumer and the second consumer is positive or negative; and
    generating the association between the first consumer and the second consumer in response to the association score exceeding a predetermined threshold score; and
    record the association between the first consumer and the second consumer in a consumer association database stored on a non-transitory computer-readable medium.

\* \* \* \* \*